(12) United States Patent
Gebert et al.

(10) Patent No.: US 11,930,392 B2
(45) Date of Patent: Mar. 12, 2024

(54) LATENCY-BOUNDED PACKET DELIVERY IN MOBILE COMMUNICATION SYSTEM

(71) Applicant: NOKIA TECHNOLOGIES OY, Espoo (FI)

(72) Inventors: Jens Gebert, Oberstenfeld (DE); Andreas Wich, Stuttgart (DE)

(73) Assignee: Nokia Technologies OY, Espoo (FI)

( * ) Notice: Subject to any disclaimer, the term of this patent is extended or adjusted under 35 U.S.C. 154(b) by 290 days.

(21) Appl. No.: 17/294,902

(22) PCT Filed: Nov. 20, 2018

(86) PCT No.: PCT/EP2018/081931
§ 371 (c)(1),
(2) Date: May 18, 2021

(87) PCT Pub. No.: WO2020/104017
PCT Pub. Date: May 28, 2020

(65) Prior Publication Data
US 2022/0022088 A1   Jan. 20, 2022

(51) Int. Cl.
*H04W 28/02*     (2009.01)
*H04L 43/0852*   (2022.01)
*H04L 47/2425*   (2022.01)

(52) U.S. Cl.
CPC ..... *H04W 28/0268* (2013.01); *H04L 43/0858* (2013.01); *H04L 47/2425* (2013.01)

(58) Field of Classification Search
None
See application file for complete search history.

(56) References Cited

U.S. PATENT DOCUMENTS

| 7,099,284 B2 * | 8/2006 | Halme ............ H04L 47/283 709/224 |
| 2015/0215193 A1 | 7/2015 | Kim et al. |

(Continued)

FOREIGN PATENT DOCUMENTS

CN   104993978   * 10/2015

OTHER PUBLICATIONS

International Search Report and Written Opinion dated Sep. 12, 2019 corresponding to International Patent Application No. PCT/EP2018/081931.

(Continued)

*Primary Examiner* — Andre Tacdiran
(74) *Attorney, Agent, or Firm* — Barta Jones, PLLC

(57) ABSTRACT

There are provided measures for enabling/realizing latency-bounded packet delivery in a mobile communication system, particularly in a mobile communication system (or mobile networking) being integrated in a time-sensitive communication system (or time-sensitive networking). Such measures exemplarily comprise that a quality-of-service flow within a packet data unit session in a mobile communication system is configured by a quality-of-service profile of deterministic communication based on setting information of the quality-of-service profile of deterministic communication, in which minimum required latency and maximum allowed latency for delivery of user plane data packets are defined, said quality-of-service flow being for delivery of user plane data packets including data of a time-sensitive communication system, a user plane data packet is received in the configured quality-of-service flow within the packet data unit session, and the received user plane data packet is processed in accordance with the quality-of-service profile of deterministic communication.

19 Claims, 19 Drawing Sheets

(56) References Cited

U.S. PATENT DOCUMENTS

| | | | | |
|---|---|---|---|---|
| 2015/0295787 A1* | 10/2015 | Kakadia | .............. | H04L 47/2441 |
| | | | | 370/236 |
| 2016/0373333 A1* | 12/2016 | Amada | ................... | H04L 47/29 |
| 2016/0380770 A1* | 12/2016 | Whitmer | ................ | G06F 21/64 |
| | | | | 713/181 |
| 2019/0007969 A1* | 1/2019 | Shako | ....................... | H04L 5/14 |
| 2021/0329596 A1* | 10/2021 | Freda | ................. | H04W 72/541 |

OTHER PUBLICATIONS

Ahmed Nasrallah et al., "Ultra-Low Latency (ULL) Networks: The IEEE TSN and IETF DetNet Standards and Related 5G ULL Research," arxiv.org, Cornell University Library, Mar. 20, 2018, XP081196057.

* cited by examiner

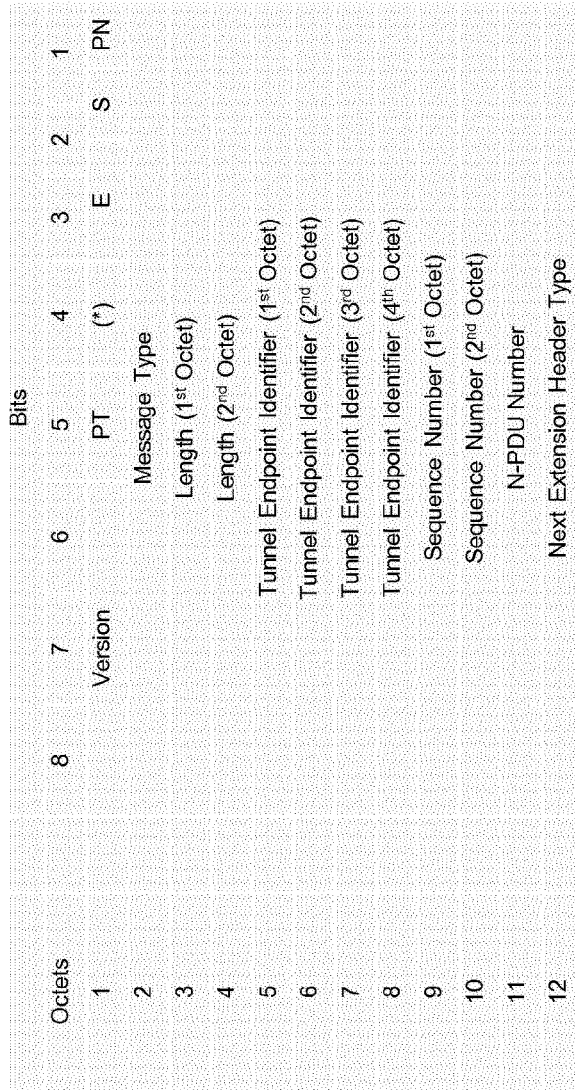
Fig. 12(A)
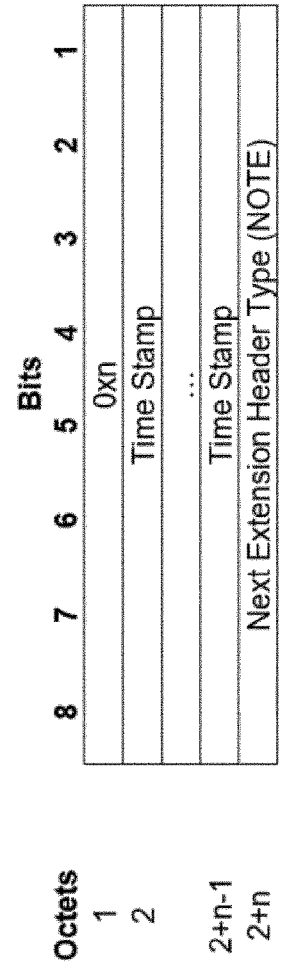
Fig. 12(B)
Figure 12

LATENCY-BOUNDED PACKET DELIVERY IN MOBILE COMMUNICATION SYSTEM

FIELD

The present disclosure relates to latency-bounded packet delivery in a mobile communication system. More specifically, the present invention relates to measures (including methods, apparatuses (i.e. devices and/or functions) and computer program products) for enabling/realizing latency-bounded packet delivery in a mobile communication system, particularly in a mobile communication system (or mobile networking) being integrated in a time-sensitive communication system (or time-sensitive networking).

BACKGROUND

Basically, the present disclosure addresses integration of a mobile communication system (or mobile networking) in a time-sensitive communication system (or time-sensitive networking). As an example, a 3GPP-standardized communication system, such as a 5G system, can be integrated in an IEEE-standardized communication system, such as an Ethernet network.

In IEEE-standardized communication systems, Time Sensitive Networking (TSN) is defined by a set of standards to define mechanisms for the time-sensitive (i.e. deterministic) transmission of data (or interworking) over Ethernet networks under development by the Time-Sensitive Networking task group of the IEEE 802.1 working group. Such networks also include industrial networks such as Industrial Ethernet.

In 3GPP-standardized communication systems, deterministic communication services shall be supported in 5G systems. In this regard, a deterministic communication service is understood as a communication service providing guaranteed packet transport with bounded low latency and offset compared to agreed global time of delivery/reception, low packet delay variation, low packet loss, and high reliability. However, despite the description of applicable use cases, current 3GPP 5G systems do not support deterministic (real-time) communication. That this, there are currently no procedures in 3GPP systems for the user plane handling to deliver a user plane data packet with bounded latency, i.e. in a defined time window.

For the integration of a mobile communication system (or mobile networking) in a time-sensitive communication system (or time-sensitive networking), it is required that the mobile communication system is able to cope with packet delivery requirements/constraints given by the time-sensitive or deterministic transmission of data over the time-sensitive communication system.

Accordingly, there is a desire for enabling/realizing latency-bounded packet delivery in a mobile communication system, particularly in a mobile communication system (or mobile networking) being integrated in a time-sensitive communication system (or time-sensitive networking).

SUMMARY

Various exemplifying embodiments of the present invention aim at addressing at least part of the above issues and/or problems and drawbacks.

Various aspects of exemplifying embodiments of the present invention are set out in the appended claims.

According to an example aspect of the present invention, there is provided a method comprising configuring a quality-of-service flow within a packet data unit session in a mobile communication system by a quality-of-service profile of deterministic communication based on setting information of the quality-of-service profile of deterministic communication, in which minimum required latency and maximum allowed latency for delivery of user plane data packets are defined, said quality-of-service flow being for delivery of user plane data packets including data of a time-sensitive communication system, receiving a user plane data packet in the configured quality-of-service flow within the packet data unit session, and processing the received user plane data unit packet in accordance with the quality-of-service profile of deterministic communication by using a delivery-related parameter in the user plane data packet, said delivery-related parameter being indicative of a time attribute of the user plane data packet.

According to an example aspect of the present invention, there is provided a method comprising managing a packet data unit session in a mobile communication system, said packet data unit session comprising a quality-of-service flow for delivery of user plane data packets including data of a time-sensitive communication system, setting a quality-of-service profile of deterministic communication, in which minimum required latency and maximum allowed latency for delivery of user plane data packets are defined, for the quality-of-service flow within the managed packet data unit session, and providing setting information of the set quality-of-service profile of deterministic communication for user plane nodes involved in the managed packet data unit session in the mobile communication system, said setting information enabling configuration of the quality-of-service flow within the packet data unit session such that a user plane data packet in accordance with the quality-of-service profile of deterministic communication is processed by using a delivery-related parameter in the user plane data packet, said delivery-related parameter being indicative of a time attribute of the user plane data packet.

According to an example aspect of the present invention, there is provided an apparatus comprising at least one processor and at least one memory including a computer program code, wherein the at least one memory and the computer program code are configured, with the at least one processor, to cause the apparatus to perform at least the following: configuring a quality-of-service flow within a packet data unit session in a mobile communication system by a quality-of-service profile of deterministic communication based on setting information of the quality-of-service profile of deterministic communication, in which minimum required latency and maximum allowed latency for delivery of user plane data packets are defined, said quality-of-service flow being for delivery of user plane data packets including data of a time-sensitive communication system, receiving a user plane data packet in the configured quality-of-service flow within the packet data unit session, and processing the received user plane data packet in accordance with the quality-of-service profile of deterministic communication by using a delivery-related parameter in the user plane data packet, said delivery-related parameter being indicative of a time attribute of the user plane data packet.

According to an example aspect of the present invention, there is provided an apparatus comprising means for configuring a quality-of-service flow within a packet data unit session in a mobile communication system by a quality-of-service profile of deterministic communication based on setting information of the quality-of-service profile of deterministic communication, in which minimum required latency and maximum allowed latency for delivery of user plane data packets are defined, said quality-of-service flow being for delivery of user plane data packets including data of a time-sensitive communication system, means for receiving a user plane data packet in the configured quality-of-service flow within the packet data unit session, and means for processing the received user plane data packet in accordance with the quality-of-service profile of deterministic communication by using a delivery-related parameter in the user plane data packet, said delivery-related parameter being indicative of a time attribute of the user plane data packet.

According to an example aspect of the present invention, there is provided an apparatus comprising at least one processor and at least one memory including a computer program code, wherein the at least one memory and the computer program code are configured, with the at least one processor, to cause the apparatus to perform at least the following: managing a packet data unit session in a mobile communication system, said packet data unit session comprising a quality-of-service flow for delivery of user plane data packets including data of a time-sensitive communication system, setting a quality-of-service profile of deterministic communication, in which minimum required latency and maximum allowed latency for delivery of user plane data packets are defined, for the quality-of-service flow within the managed packet data unit session, and providing setting information of the set quality-of-service profile of deterministic communication for user plane nodes involved in the managed packet data unit session in the mobile communication system, said setting information enabling configuration of the quality-of-service flow within the packet data unit session such that a user plane data packet in accordance with the quality-of-service profile of deterministic communication is processed by using a delivery-related parameter in the user plane data packet, said delivery-related parameter being indicative of a time attribute of the user plane data packet.

According to an example aspect of the present invention, there is provided an apparatus comprising means for managing a packet data unit session in a mobile communication system, said packet data unit session comprising a quality-of-service flow for delivery of user plane data packets including data of a time-sensitive communication system, means for setting a quality-of-service profile of deterministic communication, in which minimum required latency and maximum allowed latency for delivery of user plane data packets are defined, for the quality-of-service flow within the managed packet data unit session, and means for providing setting information of the set quality-of-service profile of deterministic communication for user plane nodes involved in the managed packet data unit session in the mobile communication system, said setting information enabling configuration of the quality-of-service flow within the packet data unit session such that a user plane data packet in accordance with the quality-of-service profile of deterministic communication is processed by using a delivery-related parameter in the user plane data packet, said delivery-related parameter being indicative of a time attribute of the user plane data packet.

According to an example aspect of the present invention, there is provided a computer program product comprising (computer-executable) computer program code which, when the program code is executed (or run) on a computer or the program is run on a computer (e.g. a computer of an apparatus according to any one of the aforementioned apparatus-related example aspects of the present invention), is configured to cause the computer to carry out the method according to any one of the aforementioned method-related example aspects of the present invention.

The computer program product may comprise or may be embodied as a (tangible/non-transitory) computer-readable (storage) medium or the like, on which the computer-executable computer program code is stored, and/or the program is directly loadable into an internal memory of the computer or a processor thereof.

Further developments and/or modifications of the aforementioned exemplary aspects of the present invention are set out in the following.

By way of exemplifying embodiments of the present invention, latency-bounded packet delivery in a mobile communication system, particularly in a mobile communication system (or mobile networking) being integrated in a time-sensitive communication system (or time-sensitive networking), can be enabled/realized. Thereby, a measure/mechanism is provided for a mobile communication system to allow latency-bounded packet delivery, i.e. to deliver a packet in a defined time window so as to comply with packet delivery requirements/constraints of the time-sensitive communication system.

BRIEF DESCRIPTION OF THE DRAWINGS

In the following, the present invention will be described in greater detail by way of non-limiting examples with reference to the accompanying drawings, in which.

DETAILED DESCRIPTION

Figure 1:
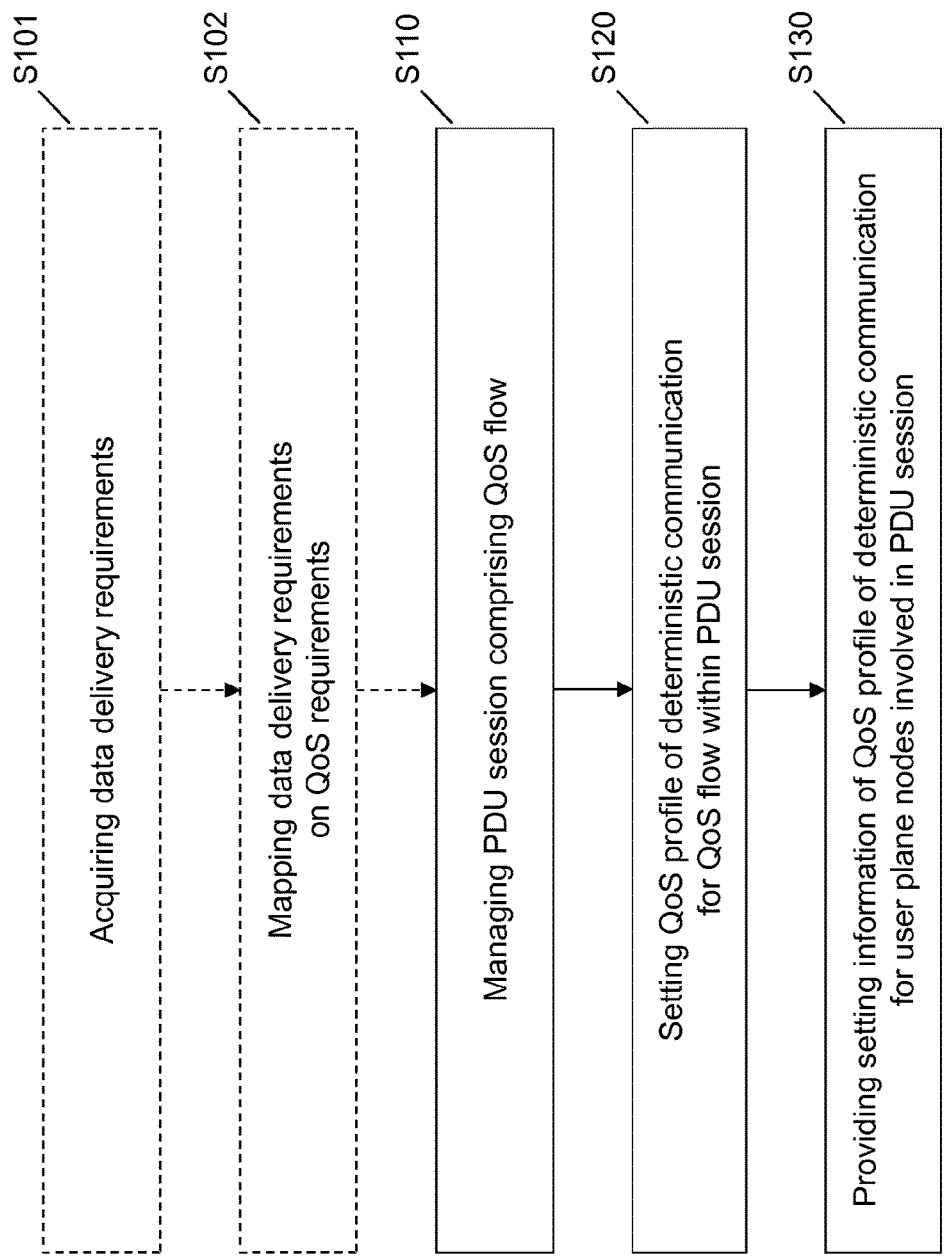
FIG. 1 shows a flowchart illustrating an example of a method, operable on the control plane, according to exemplifying embodiments of the present invention.

The present disclosure is described herein with reference to particular non-limiting examples and to what are presently considered to be conceivable embodiments of the present invention. A person skilled in the art will appreciate that the present invention is by no means limited to these examples and embodiments, and may be more broadly applied.

It is to be noted that the following description of the present invention and its embodiments mainly refers to specifications being used as non-limiting examples for certain exemplifying network configurations and system deployments. Namely, the present invention and its embodiments are mainly described in relation to 3GPP standards, specially referring to 5G standardization (e.g. Release-15/16), and IEEE standards, specifically referring to TSN/Ethernet networks, being used as non-limiting examples. As such, the description of exemplifying embodiments given herein specifically refers to terminology which is directly related thereto. Such terminology is only used in the context of the presented non-limiting examples and embodiments, and does naturally not limit the invention in any way. Rather, any other system configuration or deployment may equally be utilized as long as complying with what is described herein and/or exemplifying embodiments described herein are applicable to it.

Hereinafter, various exemplifying embodiments and implementations of the present invention and its aspects are described using several variants and/or alternatives. It is generally to be noted that, according to certain needs and constraints, all of the described variants and/or alternatives may be provided alone or in any conceivable combination (also including combinations of individual features of the various variants and/or alternatives). In this description, the words "comprising" and "including" should be understood as not limiting the described exemplifying embodiments and implementations to consist of only those features that have been mentioned, and such exemplifying embodiments and implementations may also contain features, structures, units, modules etc. that have not been specifically mentioned.

In the drawings, it is to be noted that lines/arrows interconnecting individual blocks or entities are generally meant to illustrate an operational coupling there-between, which may be a physical and/or logical coupling, which on the one hand is implementation-independent (e.g. wired or wireless) and on the other hand may also comprise an arbitrary number of intermediary functional blocks or entities not shown.

According to exemplifying embodiments of the present invention, in general terms, there are provided measures (including methods, apparatuses (i.e. devices and/or functions) and computer program products) for enabling/realizing latency-bounded packet delivery in a mobile communication system, particularly in a mobile communication system (or mobile networking) being integrated in a time-sensitive communication system (or time-sensitive networking). More specifically, a measure/mechanism is provided for a mobile communication system to allow latency-bounded packet delivery, i.e. to deliver a packet in a defined time window so as to comply with packet delivery requirements/constraints of the time-sensitive communication system. In latency-bounded packet delivery according to exemplifying embodiments of the present invention, a (delivery-related) parameter in user plane packets is used, wherein the (delivery-related) parameter is indicative of a (delivery-related) time attribute of the user plane data packet.

The expression Time Sensitive Networking (TSN) herein mainly refers IEEE-standardized communication systems, and is defined by a set of standards to define mechanisms for the time-sensitive (i.e. deterministic) transmission of data (or interworking) over Ethernet networks or Industrial Ethernet under development by the Time-Sensitive Networking task group of the IEEE 802.1 working group. The expression deterministic communication or deterministic communication service herein mainly refers to 3GPP-standardized communication systems, and is understood as a communication or communication service providing guaranteed packet transport with bounded low latency and offset compared to agreed global time of delivery/reception, low packet delay variation, low packet loss, and high reliability. The expression bounded latency or latency-bounded packet delivery herein refers to packet delivery in a defined time window, i.e. to deliver a packet with a latency larger than a minimum required latency but smaller than a maximum allowed latency. That is, bounded latency means that a data packet should be inside a communication system at least for a minimum latency time and not longer than a maximum latency time. In this regard, the delivery of a packet herein mainly refers to the provision of a packet from an ingress interface (where the packet enters into the mobile communication system from the time-sensitive communication system) to an egress interface (where the packet leaves the mobile communication system into the time-sensitive communication system), i.e. the transport or transport time of a packet (carrying or representing data of the time-sensitive communication system) through/over the mobile communication system.

FIG. 1 shows a flowchart illustrating an example of a method, operable on the control plane (of a mobile communication system being integrated in a time-sensitive communication system), according to exemplifying embodiments of the present invention. The method of FIG. 1 is operable at or by a network element, entity or function on the control plane, such as the SMF according to FIG. 3, the CPFs according to FIG. 4, or the like.

As shown in FIG. 1, a method according to exemplifying embodiments of the present invention comprises an operation (S110) of managing a packet data unit, PDU, session in a mobile communication system, said packet data unit, PDU, session comprising a quality-of-service, QoS, flow for delivery of user plane data packets including data of a time-sensitive communication system, an operation (S120) of setting a quality-of-service, QoS, profile of deterministic communication, in which minimum required latency and maximum allowed latency for delivery of user plane data packets are defined, for the quality-of-service, QoS, flow within the managed packet data unit, PDU, session, and an operation (S130) of providing setting information of the set quality-of-service, QoS, profile of deterministic communication for user plane nodes involved in the managed packet data unit, PDU, session in the mobile communication system.

According to exemplifying embodiments of the present invention, the setting information enables configuration of the quality-of-service, QoS, flow within the packet data unit, PDU, session such that a user plane data packet in accordance with the quality-of-service, QoS, profile of deterministic communication is processed by (using) a parameter (which may also be referred to as a delivery-related parameter) in the user plane data packet, namely a parameter indicating or representing a time relating to delivery/transport of the user plane data packet. That is, the (delivery-related) parameter is indicative of a (delivery-related) time attribute of the user plane data packet.

As shown by dashed lines in FIG. 1, a method according to exemplifying embodiments of the present invention may also comprise an operation (S101) of acquiring delivery requirements of the data of the time-sensitive communication system from a control node of the time-sensitive communication system, and an operation (S102) of mapping the acquired delivery requirements of the data of the time-sensitive communication system on quality-of-service, QoS, requirements of the mobile communication system, wherein, in the setting operation (S120), the quality-of-service, QoS, profile of deterministic communication is set in accordance with the acquired delivery requirements of the data of the time-sensitive communication system and/or the mapped quality-of-service, QoS, requirements of the mobile communication system.

Figure 2:
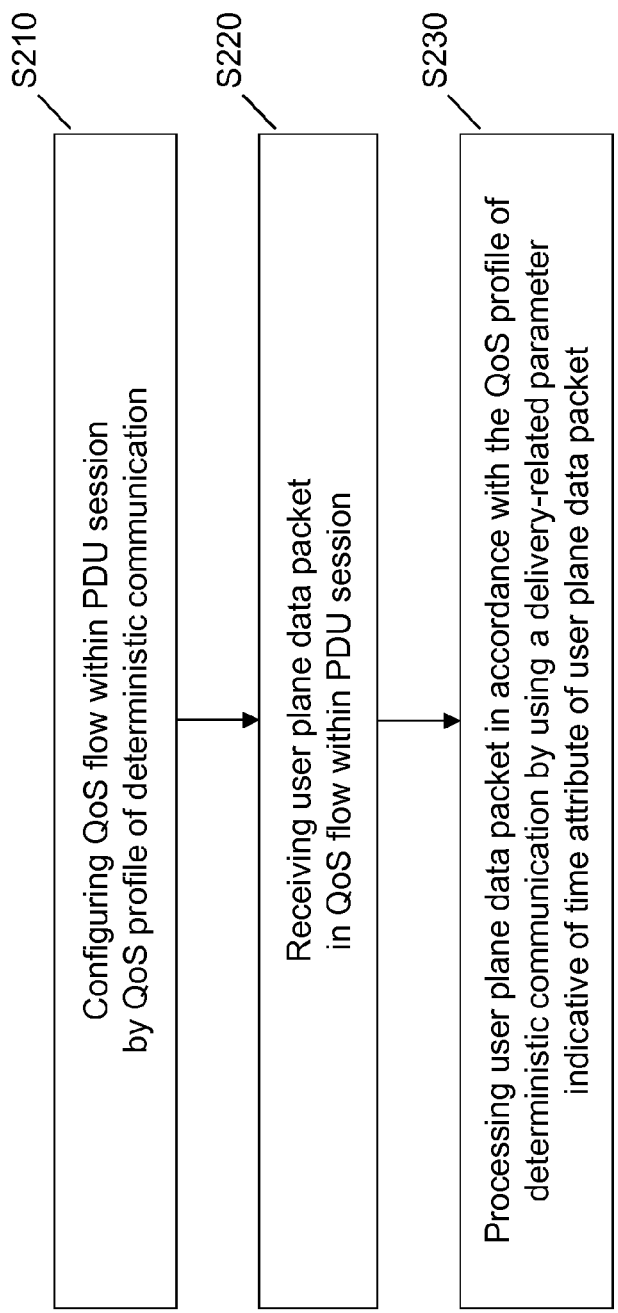
FIG. 2 shows a flowchart illustrating an example of a method, operable on the user plane, according to exemplifying embodiments of the present invention.

FIG. 2 shows a flowchart illustrating an example of a method, operable on the user plane (of a mobile communication system being integrated in a time-sensitive communication system), according to exemplifying embodiments of the present invention. The method of FIG. 1 is operable at or by a network element, entity or function on the control plane, such as any one of the UE, the (R)AN, the UPF according to FIG. 3, any one of the UE, the base station, the UPF 1, the UPF 2 according to FIG. 4, or the like.

As shown in FIG. 2, a method according to exemplifying embodiments of the present invention comprises an operation (S210) of configuring a quality-of-service, QoS, flow within a packet data unit, PDU, session in a mobile communication system by a quality-of-service, QoS, profile of deterministic communication based on setting information of the quality-of-service, QoS, profile of deterministic communication, in which minimum required latency and maximum allowed latency for delivery of user plane data packets are defined, said quality-of-service, QoS, flow being for delivery of user plane data packets including data of a time-sensitive communication system, an operation (S220) of receiving a user plane data packet in the configured quality-of-service, QoS, flow within the packet data unit, PDU, session, and an operation (S230) of processing the received user plane data packet in accordance with the quality-of-service, QoS, profile of deterministic communication by using a parameter in the user plane data packet.

According to exemplifying embodiments of the present invention, the packet processing is effected/controlled by (using) a parameter (which may also be referred to as a delivery-related parameter) in the user plane data packet, namely a parameter indicating or representing a time relating to delivery/transport of the user plane data packet. That is, the (delivery-related) parameter is indicative of a (delivery-related) time attribute of the user plane data packet.

According to exemplifying embodiments of the present invention, the processing operation (S230) can encompass various processes, as exemplified below with respect to FIGS. 5 to 9 and 13 to 16.

Figure 3:
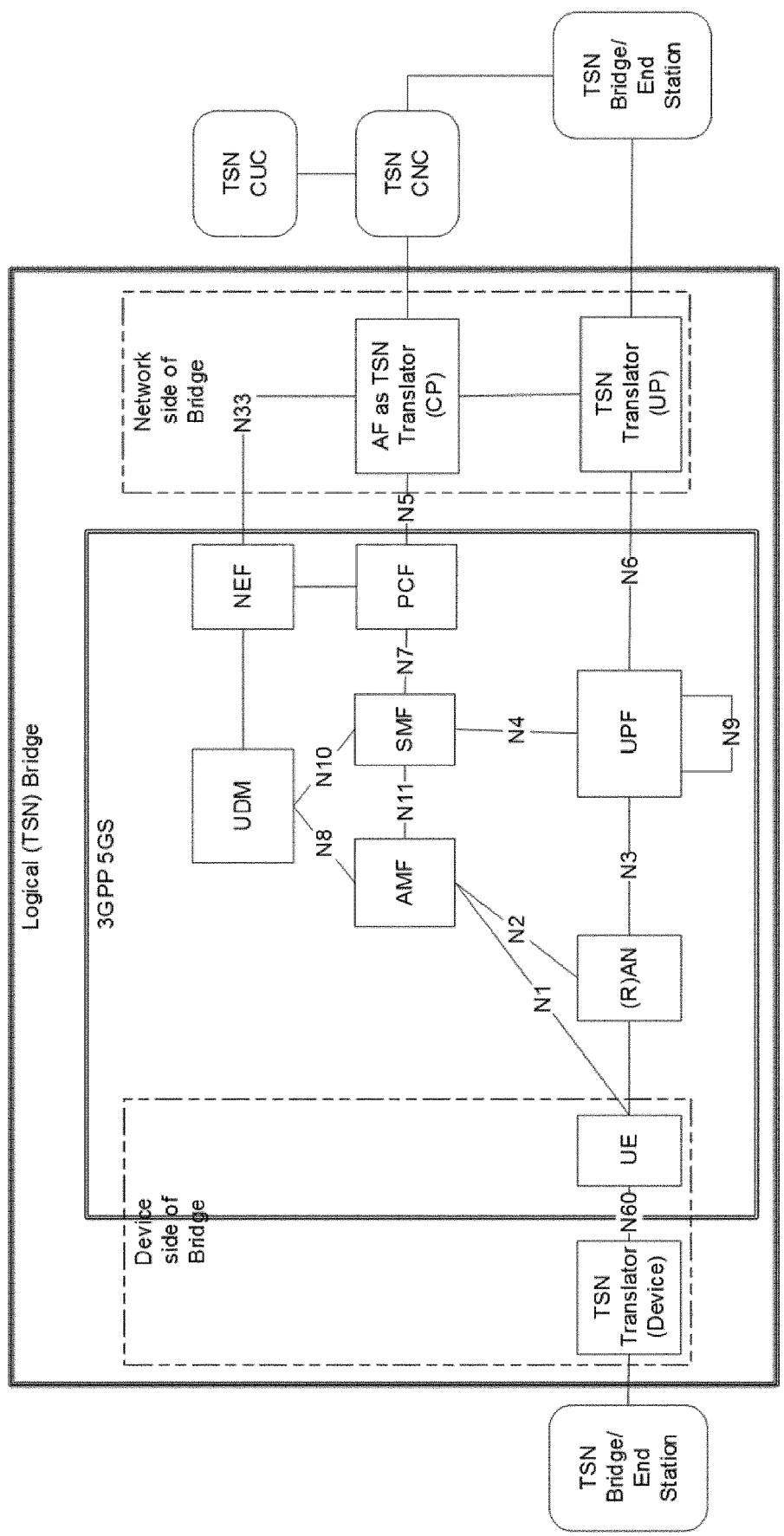
FIG. 3 shows a block diagram illustrating an example of a system architecture of an integration of a 5G network in an TSN network according to exemplifying embodiments of the present invention.

FIG. 3 shows a block diagram illustrating an example of a system architecture of an integration of a 5G network in an TSN network according to exemplifying embodiments of the present invention. That is, exemplifying embodiments of the present invention can be implemented in the system architecture of FIG. 3.

As shown in FIG. 3, a 3GPP 5G system is integrated in a TSN system such that the 3GPP 5G system appears (or acts) as a logical (TSN) bridge within the TSN system, i.e. the TSN system sees the 3GPP 5G system as a logical (TSN) bridge. This logical (TSN) bridge included adaptation function(s) to translate the protocols and information elements of the 3GPP 5G system to protocols and information elements of the TSN system, and vice versa.

The 3GPP 5G system is implemented transparently to the TSN system, which means that (access and core network) procedures of the 3GPP 5G system remain hidden from the TSN system. This transparency is achieved in that the 3GPP 5G Bridge provides TSN ingress and egress interfaces/ports via a so-called Translator on the device side and a so-called Network Translator on the network side.

Modelling the 3GPP 5G system as a logical (TSN) Bridge has the advantage that capabilities of the 3GPP 5G system can be exposed using the respective information models for describing TSN bridge capabilities, which are suited to capture the characteristics of the 3GPP 5G system compared to the TSN link model attributes. Moreover, this approach allows for controlling the interaction with the major TSN control entity (TSN CNC), e.g. for negotiating QoS attributes. Finally, with the introduction of the TSN Translators at the UE side and the network side, it is possible to reuse many of the existing interfaces or reference points defined for the 3GPP 5G system. For example, requirements on determinism of TSN flows/streams are known in the TSN CNC and can be given via a Translator and the N5 interface towards the 3GPP 5G system which enables the 3GPP Session Management Function (SMF) to have knowledge on deterministic requirements of a TSN flow/stream which is to be transported via the 3GPP 5G system.

In the system architecture of FIG. 3, the SMF can manage a PDU session in the 3GPP 5G system, which comprises a QoS flow for delivery of user plane data packets including data of the TSN system. In this regard, the SMF applies 3GPP QoS model with its QoS flows. Namely, in the 3GPP 5G system, the QoS flow is the finest granularity of QoS differentiation in the PDU Session. A QoS Flow ID (QFI) is used to identify a QoS flow. User Plane traffic with the same QFI within a PDU Session receives the same traffic forwarding treatment (e.g. scheduling, admission threshold).

The QFI is carried in an encapsulation header on N3 (and N9), i.e. without any changes to the E2E packet header, and shall be unique within a PDU Session. The QFI may be dynamically assigned or may be equal to the 5QI. Accordingly, within the 3GPP 5G system, a QoS flow is controlled by the Session Management Function (SMF) and may be preconfigured, or established via the PDU Session Establishment procedure or the PDU Session Modification procedure, as defined in 3GPP standards.

Further, the SMF can acquire delivery requirements of the data of the TSN system from the TSN CNC, and map the acquired delivery requirements on QoS requirements of the 3GPP 5G system. Based thereon, the SMF can set a QoS profile of deterministic communication (such as a QoS profile "Deterministic GBR"), in which minimum required latency and maximum allowed latency for delivery of user plane data packets are defined, for the QoS flow within the managed PDU session, i.e. the QoS flow for delivery of user plane data packets including data of the TSN system. The setting of the QoS profile of deterministic communication can preferably be set in accordance with the acquired delivery requirements of the data of the TSN system and/or the mapped QoS requirements of the 3GPP 5G system. Then, the SMF can provide setting information of the set QoS profile of deterministic communication for user plane nodes involved in the managed PDU session in the 3GPP 5G system. In the illustrated example, the setting information can be provided to the UPF directly from the SMF and to the UE and the (R)AN via the AMF.

Any one of the user plane nodes involved in the managed PDU session in the 3GPP 5G system, which are provided with the setting information from the SMF, i.e. the UPF, the UE and the (R)AN, can then configure the QoS flow, i.e. the aforementioned QoS flow for delivery of user plane data packets including data of the TSN system, by the QoS profile of deterministic communication based on the setting information. When receiving a user plane data packet in the configured QoS flow, the respective user plane node can process the received user plane data packet in accordance with the QoS profile of deterministic communication. Such processing will be exemplified below with respect to FIGS. 5 to 9 and 13 to 17.

As an alternative to the above-described implementation, a 3GPP 5G system may be integrated in a TSN system such that the 3GPP 5G system appears (or acts) as a logical (TSN) link within the TSN system, i.e. the TSN system sees the 3GPP 5G system as a logical (TSN) link.

Figure 4:
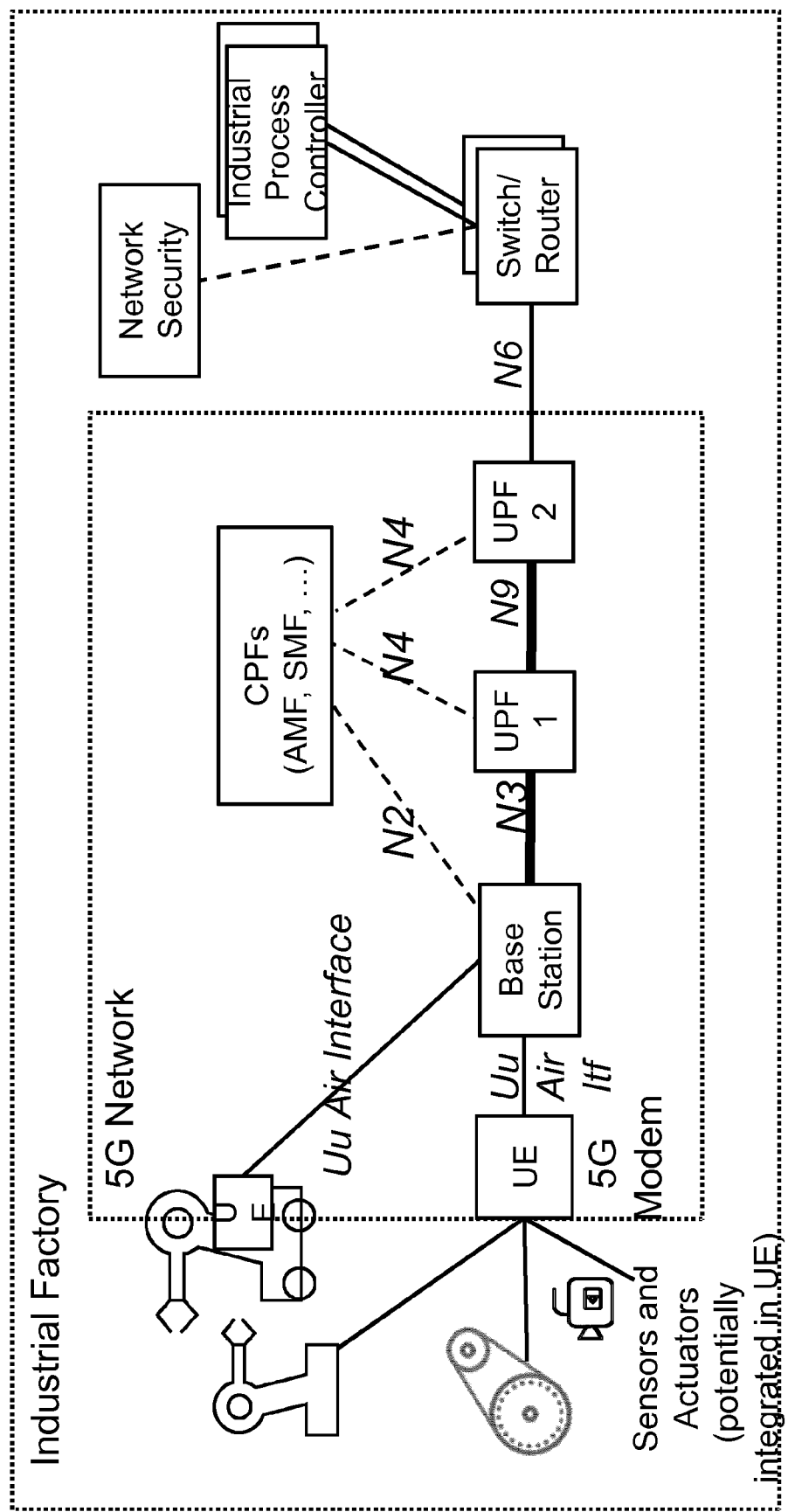
FIG. 4 shows a block diagram illustrating an example of a system architecture of an industrial automation network, in which a 5G network is integrated, according to exemplifying embodiments of the present invention.

FIG. 4 shows a block diagram illustrating an example of a system architecture of an industrial automation network, in which a 5G network is integrated, according to exemplifying embodiments of the present invention. That is, exemplifying embodiments of the present invention can be implemented in the system architecture of FIG. 4.

As shown in FIG. 4, a 5G network is integrated in and thus part of an industrial factory environment. For such implementation, similar notions as explained above for the implementation of FIG. 3 apply accordingly. The correspondence between these implementations is evident from the common denominations of nodes of the 5G network in FIG. 4 and the 3GPP 5G system in FIG. 3 (wherein the Base Station of FIG. 4 corresponds to the (R)AN of FIG. 3), as well as the denominations of the respective interfaces or reference points (namely, N2, N3, N4, N6 and N9).

In an industrial automation network, the machines, robots, sensors, actuators, industrial process controllers etc. are communicating with each other over the network. The industrial automation network of FIG. 4 can thus represent an example of an industrial environment which may be referred to as Industrial IoT (IIoT) or Industry 4.0. In such industrial environment, Ethernet or Industrial Ethernet is the main end-to-end communication layer (as compared with IP which is the main end-to-end communication layer in mobile/wireless communication systems).

As indicated above, IEEE TSN standards define mechanisms for time sensitive and deterministic communication/interworking (including determinism and real-time control). The thus relevant IEEE standard extensions for Time Sensitive Networking (TSN) include e.g.

IEEE 802.1Qbv—Scheduled Traffic,
IEEE 802.1Qci—Ingress Policing,
IEEE 802.1CB—Seamless Redundancy,
IEEE 802.1Qcc—Stream Reservation Protocol,
IEEE 802.1Qbu/802.3br—Preemption As regards the operation of the overall system according to exemplifying embodiments of the present invention, reference is made to the above explanation in connection with FIG. 3, which applies accordingly.

In the following, exemplifying embodiments of the present invention are described, in which the delivery-related parameter, upon which packet processing is effected/controlled, comprises (or is) a time stamp in the user plane data packet.

Figure 5:
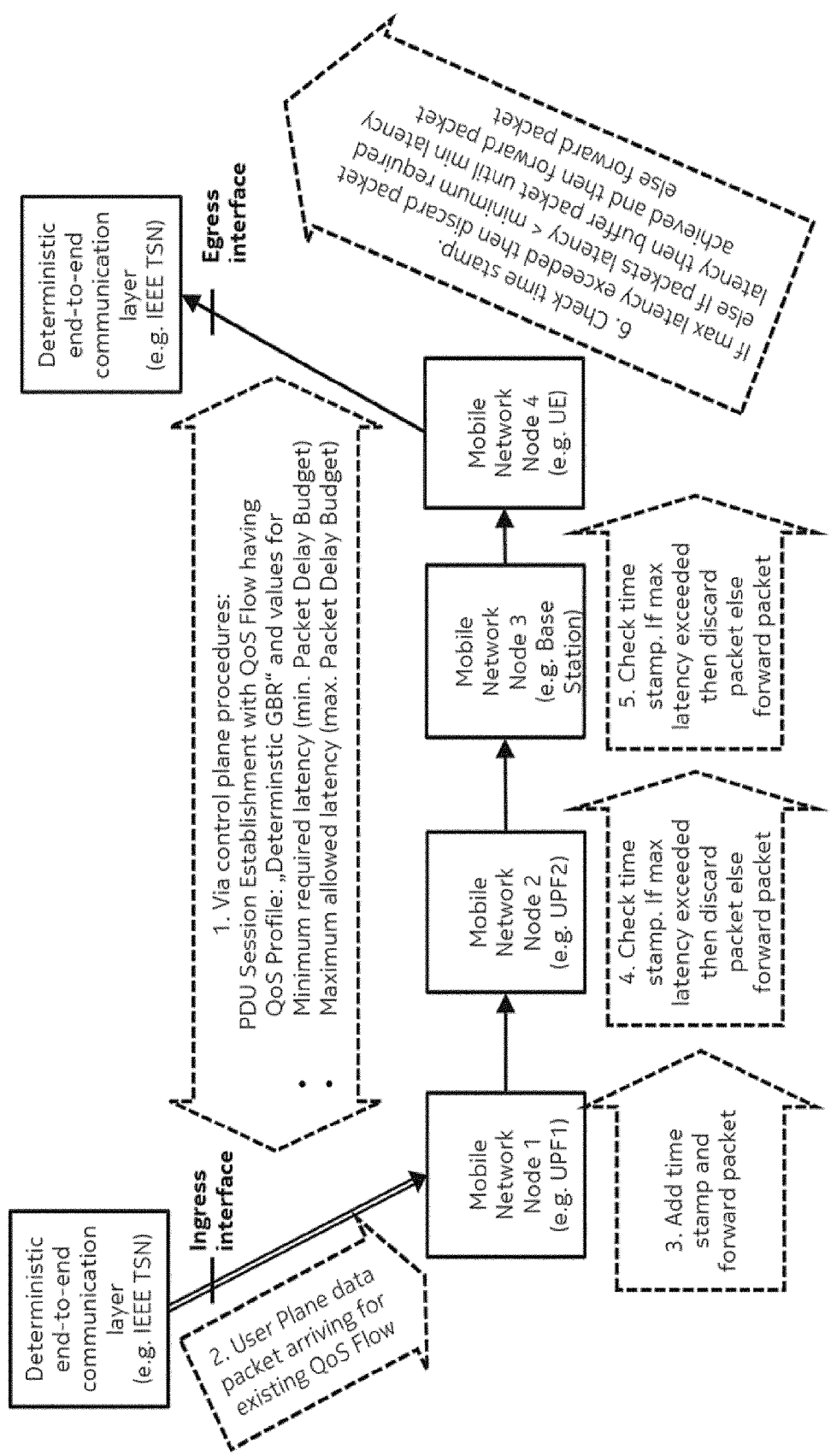
FIG. 5 shows a schematic diagram illustrating an example of a procedure for latency-bounded packet delivery according to exemplifying embodiments of the present invention.

FIG. 5 shows a schematic diagram illustrating an example of a procedure for latency-bounded packet delivery according to exemplifying embodiments of the present invention. The exemplary procedure of FIG. 5 is applicable to/in any one of the exemplary system architectures of FIGS. 3 and 4, respectively.

The exemplary procedure of FIG. 5 is illustrated under the assumption that an IEEE TSN network constitutes (a deterministic end-to-end communication layer/network of) the superordinate time-sensitive communication system, and a mobile network constitutes the subordinate mobile communication system being integrated in the superordinate time-sensitive communication system. Further, it is assumed that the mobile network has a UPF 1, a UPF 2, a Base Station and a UE as user plane nodes being involved in a PDU session being managed by a control plane node such as the SMF. Still further, it is assumed that data of the IEEE TSN network is to be transported over the mobile network, wherein the data is required to be transported with bounded latency (or deterministic communication).

For the packet delivery according to the procedure of FIG. 5, communication in downlink direction is assumed, wherein the UPF connected to an external data network is the first node while any other UPF/s or base station are intermediate nodes and the UE is the last node of the mobile communication system. Otherwise, in the case of communication in uplink direction, the UE would be the first node, the base station (and one or more UPFs) would be an intermediate node and the UPF connected to an external data network would be the last node of the mobile communication system. As shown in FIG. 5, the thus exemplified procedure comprises six operations/processes.

In a first operation/process, which can be performed by a session management node such as a SMF of the mobile network, a PDU session is established in the mobile network by at least one control plane node of the mobile network, i.e. via control plane procedures of the mobile network. In this regard, a PDU session is managed, e.g. by way of PDU session establishment with a QoS flow having a QoS profile of deterministic communication between the UPF 1 as the first node in the mobile network and the UE as the last node in the mobile network. The QoS profile of deterministic communication can for example be denoted as QoS profile "Deterministic GBR" having values by which minimum required latency (which can also be referred to as minimum packet delay budget) and maximum allowed latency (which can also be referred to as maximum packet delay budget) are defined for the delivery of user plane data packets via this QoS flow. The minimum required latency and the maximum allowed latency, which represent a defined time window for packet delivery, can be set in accordance with or depending on the data delivery requirements of the data to be transported, i.e. the TSN flow/stream which is to be mapped to or carried via the QoS profile of deterministic communication.

In a second operation/process, a user plane data packet on the QoS flow having the QoS profile of deterministic communication (i.e. a user plane packet carrying data of a TSN flow/stream) is received at the UPF 1 as the first node in the mobile network from an ingress node in the TSN network, e.g. the TSN Translator (UP) or the TSN Bridge/End Station on the network side in FIG. 3.

In a third operation/process, the UPF 1 as the first node in the mobile network inserts (or adds or attaches) a time stamp to the user plane data packet. The time stamp indicates the ingress arrival time when the user plane data packet is received at the UPF 1, i.e. at/in the mobile network. Then, the UPF 1 forwards the user plane data packet with the inserted (or added or attached) time stamp to the next node in the mobile network on a session downstream side.

In a fourth operation/process, the UPF 2 as the next node or an intermediate node in the mobile network, when receiving the user plane data packet from the previous node on a session upstream side, i.e. the UPF 1, checks the time stamp so as to calculate the current delay (latency) in view of the current time. The thus calculated current delay (latency) is then checked with respect to the maximum allowed latency which is configured for the QoS profile of deterministic communication, to which the user plane data packet belongs. When the maximum allowed latency is not exceeded, the user plane data packet is forwarded to the next node in the mobile network on the session downstream side, wherein the inserted (or added or attached) time stamp is kept unchanged. Otherwise, when the maximum allowed latency is exceeded, the user plane data packet is discarded. In this case, a corresponding information regarding the packet discarding can be provided to the control plane or the TSN network.

In a fifth operation/process, the Base Station as the next node or an intermediate node in the mobile network functions as the UPF 2 in the fourth operation/process. Accordingly, reference is made to the description of the fourth operation/process above.

In a sixth operation/process, the UE as the last node in the mobile network, when receiving the user plane data packet from the previous node, i.e. the Base Station, checks the time stamp so as to calculate the current delay (latency) in view of the current time. The thus calculated current delay (latency) is then checked with respect to the maximum allowed latency and the minimum required latency which are configured for the QoS profile of deterministic communication, to which the user plane data packet belongs. When the minimum required latency is not yet met/reached, the user plane data packet is buffered before forwarding/delivery to the egress node in the TSN network, e.g. the TSN Translator (Device) or the TSN Bridge/End Station on the device side in FIG. 3, until the minimum required latency is achieved. When the minimum required latency is met/reached and the maximum allowed latency is not exceeded, the user plane data packet is forwarded/delivered to an egress node in the TSN network, e.g. the TSN Translator (Device) or the TSN Bridge/End Station on the device side in FIG. 3. When the maximum allowed latency is exceeded, the user plane data packet is discarded. In this case, corresponding information regarding the packet discarding can be provided to the control plane or the TSN network.

In the foregoing description, the time stamp (indicating the ingress arrival time when the user plane data packet is received at the UPF 1) indicates or represents a time relating to delivery/transport of the user plane data packet, and thus exemplifies a (delivery-related) time stamp according to exemplifying embodiments of the present invention, and hence a (delivery-related) time attribute of the user plane data packet.

Accordingly, it can be achieved that the user plane data packet is delivered from the ingress node in the TSN network to the egress node in the TSN network via a deterministic-communication QoS flow in the mobile network within the defined time window according to the data delivery requirements of the TSN flow/stream, the data of which are delivery over the mobile network, whereas the user plane data packet is discarded in case the packet could only be delivered with a latency larger than the allowed maximum latency.

Generally speaking, the time stamp refers to or indicates a (detected or actual) ingress time or, in other words, ingress arrival time of the user plane data packet with respect to the mobile network.

Figure 6:
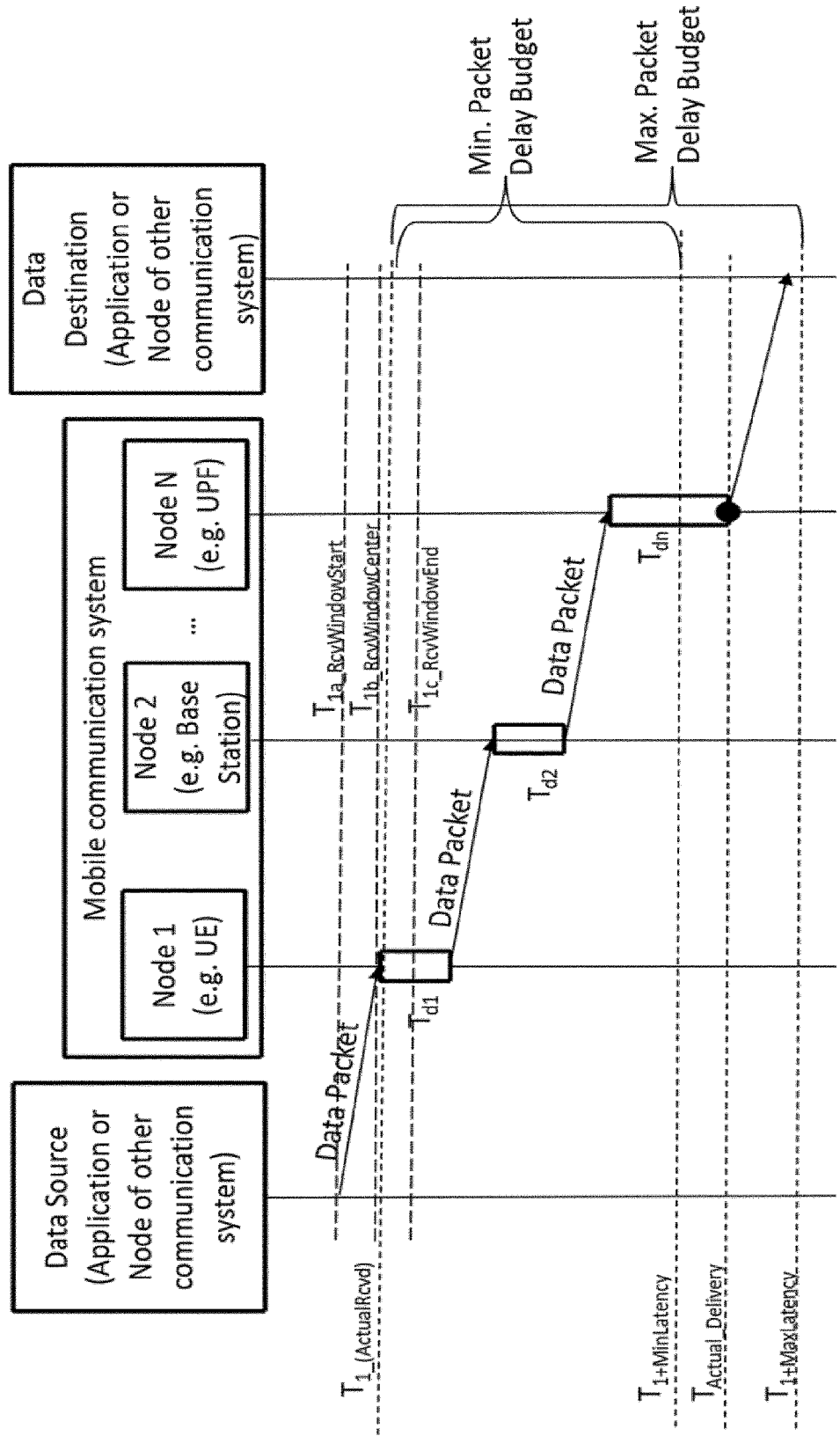
FIG. 6 shows a timing diagram illustrating an example of a process of latency-bounded packet delivery according to exemplifying embodiments of the present invention.

FIG. 6 shows a timing diagram illustrating an example of a process of latency-bounded packet delivery according to exemplifying embodiments of the present invention. The exemplary process of FIG. 6 is applicable to/in any one of the exemplary system architectures of FIGS. 3 and 4, respectively.

For the packet delivery according to the process of FIG. 6, communication in uplink direction is assumed, wherein the UE is the first node denoted as Node 1, the base station is an intermediate node denoted as Node 2 and the UPF is the last node denoted as Node N.

For the operations/processes in the individual phases of the thus illustrated procedure, reference is made to the above explanation of the exemplary procedure of FIG. 5, which applies accordingly.

As shown in FIG. 6 (as well as described for FIG. 5), the minimum packet delay budget (or the minimum required latency) and the maximum packet delay budget (or the maximum allowed latency) are defined/calculated relative to $T_1$, which is the actual arrival time of the packet at the ingress port ($T_{1\_(Actual\ Rcvd)}$).

However, the minimum/maximum packet delay budget can also be defined/calculated relative to a time window when the packet is expected at the ingress port. This time can be either one of the time when the receive window starts ($T_{1a\_RcvWindowStart}$)

the time in the middle of the receive window ($T_{1b\_RcvWindowCenter}$)

the time when the receive window ends ($T_{1c\_RcvWindowEnd}$)

According to exemplifying embodiments of the present invention, the current delay (latency) in view of the current time can be calculated at the intermediate and last nodes in the mobile network based on the current time relative to a reference time with respect to an ingress arrival time which is indicated by the time stamp in the user plane data packet. That is, the current packet delay can be calculated as a difference between the current time and a reference time with respect to an ingress arrival time which is indicated by the time stamp in the user plane data packet, wherein the reference time can be the ingress arrival time which is indicated by the time stamp ($T_{1\_(Actual\ Rcvd)}$), the start time of a receive window in which the ingress arrival time falls ($T_{1a\_RcvWindowStart}$), the middle/center time of a receive window in which the ingress arrival time falls ($T_{1b\_RcvWindowcenter}$), or the end time of a receive window in which the ingress arrival time falls ($T_{1c\_RcvWindowEnd}$).

In the exemplary process of FIG. 6, the delay/lag times in packet handling at the individual nodes are denoted by $T_{d1}$, $T_{d2}$ and $T_{dn}$ and illustrated by vertical blocks, respectively. It can be seen that packet delivery through the mobile network, i.e. to the data destination, within the defined time window is ensured.

As described above, the packet handling differs between individual nodes involved in the PDU session comprising the QoS profile of deterministic communication, depending on their position in the mobile network with respect to the packet delivery direction. In brief, the individual packet handling properties can be summarized as follows.

Figure 7:
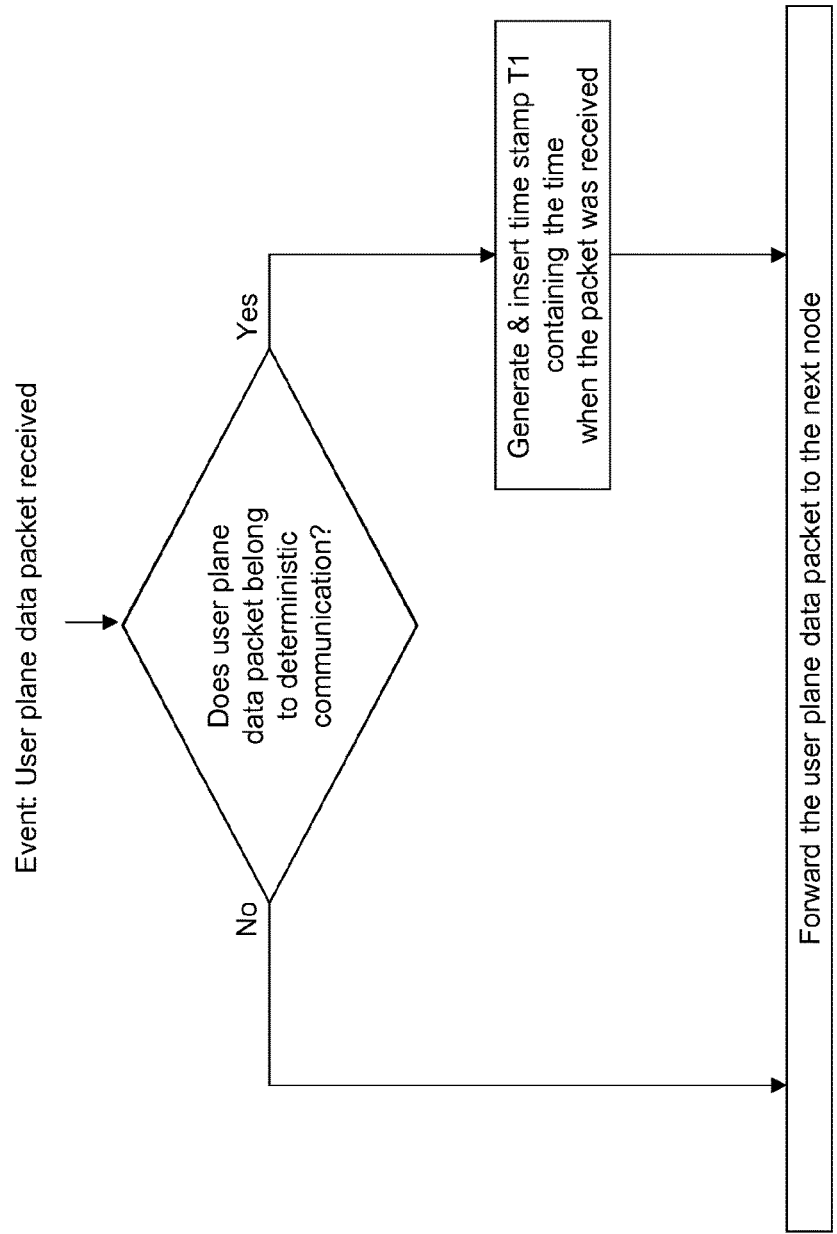
FIG. 7 shows a flowchart illustrating an example of a method, operable at a first node on the user plane, according to exemplifying embodiments of the present invention.

The first node shall insert a time stamp containing the time when the packet was received in any user plane data packet, For further details, reference is made to the third operation/process according to FIG. 5 and FIG. 7.

An intermediate node can already discard a user plane data packet in case the data packet cannot be delivered inside the required bounded latency, else the packet is forwarded to the next node. For further details, reference is made to the fourth and fifth operations/processes according to FIG. 5 and FIG. 8.

The last node shall buffer the packet in case the minimum required latency is not met/reached until the minimum required latency is met/reached. The packet shall be discarded in case the latency of the packet is larger than the maximum allowed latency, else the packet shall be delivered to the user of the communication system. For further details, reference is made to the sixth operation/process according to FIG. 5 and FIG. 9.

Figure 8:
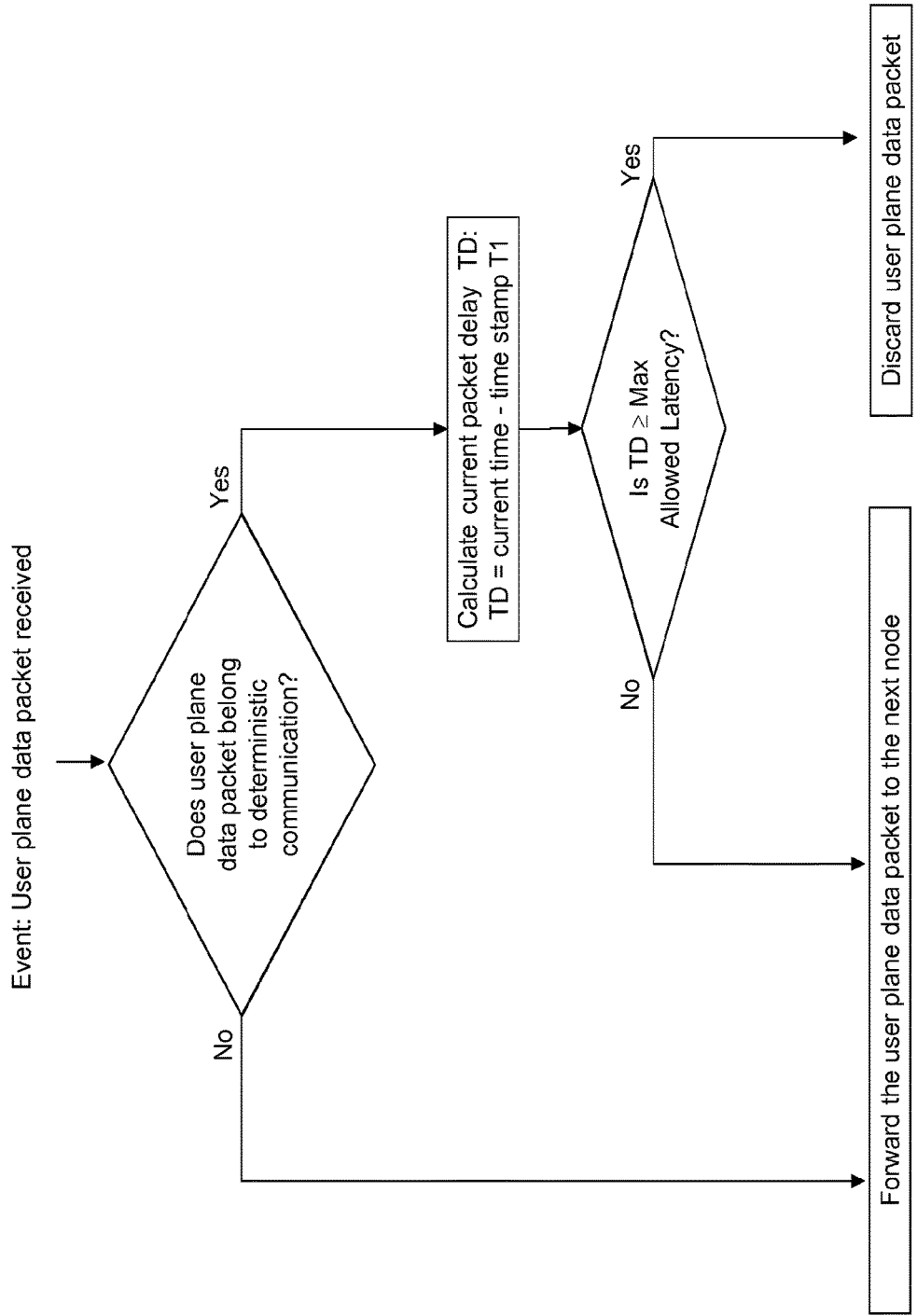
FIG. 8 shows a flowchart illustrating an example of a method, operable at an intermediate node on the user plane, according to exemplifying embodiments of the present invention.
Figure 9:
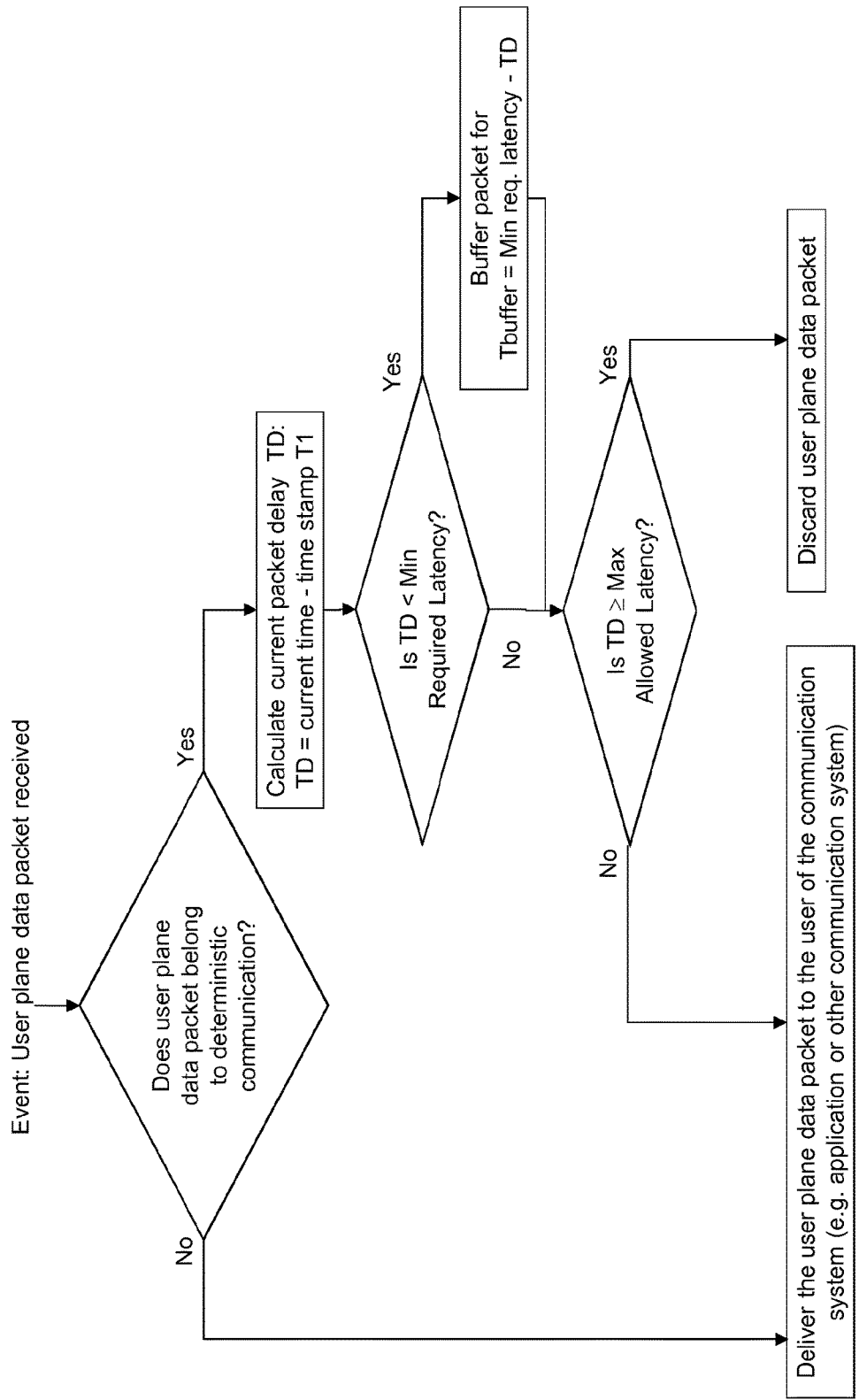
FIG. 9 shows a flowchart illustrating an example of a method, operable at a last node on the user plane, according to exemplifying embodiments of the present invention.

In the subsequent description of FIGS. 7 to 9, the time stamp (indicating the ingress arrival time when the user plane data packet is received at the UPF 1) indicates or represents a time relating to delivery/transport of the user plane data packet, and thus exemplifies a (delivery-related) time stamp according to exemplifying embodiments of the present invention.

FIG. 7 shows a flowchart illustrating an example of a method, operable at a first node on the user plane, according to exemplifying embodiments of the present invention. The method of FIG. 7 is operable at or by a network element, entity or function on the user plane, which represents a first node in the mobile communication system, such as e.g. the UPF 1 (Mobile Network Node 1) according to FIG. 5, the Node 1 according to FIG. 6, or the like.

As shown in FIG. 7, a method according to exemplifying embodiments of the present invention comprises, when a user plane data packet is received from an ingress node of the time-sensitive communication system, an operation of packet processing in accordance with the quality-of-service, QoS, profile of deterministic communication, wherein the packet processing operation comprises: inserting, in the user plane data packet, a time stamp indicating an ingress arrival time when the user plane data packet is received, and forwarding the user plane data packet, in which the time stamp is inserted, to a next user plane node in the mobile communication system towards a session downstream side.

According to exemplifying embodiments of the present invention, the method may also comprise checking whether the user plane data packet belongs to deterministic communication. Such check could be effected in consideration of the QoS flow on/in which the user plane data packet is carried, or to which the user plane data packet belongs. Accordingly, a positive result can be attained when the user plane data packet is received on/in the QoS profile of deterministic communication (e.g. the QoS profile "Deterministic GBR"), and a negative result is attained otherwise. While the user plane data packet may be forwarded towards a session downstream side in any case, the time stamp is (generated and) inserted only for a user plane data packet belonging to deterministic communication.

FIG. 8 shows a flowchart illustrating an example of a method, operable at an intermediate node on the user plane, according to exemplifying embodiments of the present invention. The method of FIG. 8 is operable at or by a network element, entity or function on the user plane, which represents an intermediate node in the mobile communication system, such as e.g. the UPF 2 (Mobile Network Node 2) or the Base Station (Mobile Network Node 3) according to FIG. 5, the Node 2 according to FIG. 6, or the like.

As shown in FIG. 8, a method according to exemplifying embodiments of the present invention comprises, when the user plane data packet is received from a previous user plane node in the mobile communication system node towards a session upstream side, an operation of packet processing in accordance with the quality-of-service, QoS, profile of deterministic communication, wherein the packet processing operation comprises: calculating a current packet delay representing a difference between a current time and a reference time with respect to an ingress arrival time which is indicated by a time stamp inserted in the user plane data packet, forwarding the user plane data packet, in which the time stamp is inserted, without changing the time stamp, to a next user plane node in the mobile communication system towards a session downstream side, if the calculated current packet delay is smaller than the defined maximum allowed latency, and discarding the user plane data packet, if the calculated current packet delay is equal to or larger than the defined maximum allowed latency.

Similar to the method of FIG. 7, according to exemplifying embodiments of the present invention, the method may also comprise checking whether the user plane data packet belongs to deterministic communication, as described above. While the user plane data packet may be processed in any case, the aforementioned calculating, forwarding and discarding operations are performed only for a user plane data packet belonging to deterministic communication, while a user plane data packet not belonging to deterministic communication is just forwarded as it is.

As an alternative to the method of FIG. 8, according to exemplifying embodiments of the present invention, a method according to exemplifying embodiments of the present invention may comprise, when the user plane data packet is received from a previous user plane node in the mobile communication system node towards a session upstream side, an operation of packet processing in accordance with the quality-of-service, QoS, profile of deterministic communication, wherein the packet processing operation comprises: forwarding the user plane data packet, in which a time stamp is inserted, without changing the time stamp, to a next user plane node in the mobile communication system towards a session downstream side.

FIG. 9 shows a flowchart illustrating an example of a method, operable at a last node on the user plane, according to exemplifying embodiments of the present invention. The method of FIG. 9 is operable at or by a network element, entity or function on the user plane, which represents a last node in the mobile communication system, such as e.g. the UE (Mobile Network Node 4) according to FIG. 5, the Node N according to FIG. 6, or the like.

As shown in FIG. 9, a method according to exemplifying embodiments of the present invention comprises, when the user plane data packet is received from a previous user plane node in the mobile communication system node towards a session upstream side, an operation of packet processing in accordance with the quality-of-service, QoS, profile of deterministic communication, wherein the packet processing operation comprises: calculating a current packet delay representing a difference between a current time and a reference time with respect to an ingress arrival time which is indicated by a time stamp inserted in the user plane data packet, buffering the user plane data packet for a buffering time representing a difference between the defined minimum required latency and the current time, if the calculated current packet delay is smaller than the defined minimum required latency, forwarding the user plane data packet to an egress node of the time-sensitive communication system, if the calculated current packet delay is smaller than the defined maximum allowed latency, and discarding the user plane data packet, if the calculated current packet delay is equal to or larger than the defined maximum allowed latency.

In the example of FIG. 9, the reference time corresponds to the (time indicated by the) time stamp. Yet, as described above, the reference time can be the ingress arrival time which is indicated by the time stamp (see $T_{1\_(Actual\ Rcvd)}$ in FIG. 6), the start time of a receive window in which the ingress arrival time falls (see $T_{1a\_RcvWindowStart}$ in FIG. 6), the middle/center time of a receive window in which the ingress arrival time falls (see $T_{1b\_RcvWindowCenter}$ in FIG. 6), or the end time of a receive window in which the ingress arrival time falls (see $T_{1c\_RcvWindowEnd}$ in FIG. 6).

Similar to the method of FIG. 7, according to exemplifying embodiments of the present invention, the method may also comprise checking whether the user plane data packet belongs to deterministic communication, as described above. While the user plane data packet may be processed in any case, the aforementioned calculating, buffering, forwarding and discarding operations are performed only for a user plane data packet belonging to deterministic communication, while a user plane data packet not belonging to deterministic communication is just forwarded as it is.

In view of exemplary embodiments of the present invention, according to which a time stamp is used, the applicable user plane protocol/s shall be able to transport the time stamp (in the user plane data packet). This requires that on each interface or reference point at least one protocol can carry such a time stamp (in the user plane data packet).

Figure 10:
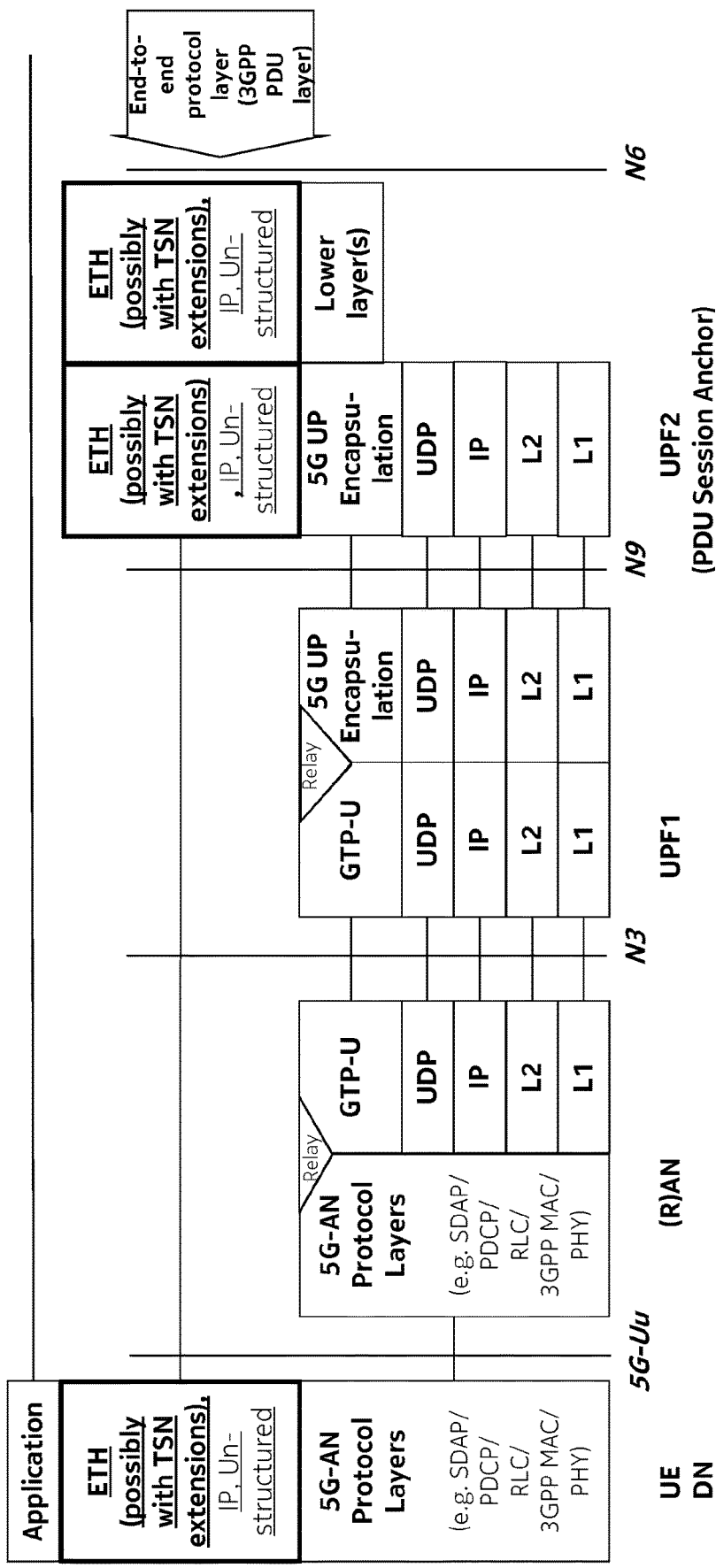
FIG. 10 shows a schematic diagram illustrating an example of user plane protocol stack which is applicable according to exemplifying embodiments of the present invention.

FIG. 10 shows a schematic diagram illustrating an example of user plane protocol stack which is applicable according to exemplifying embodiments of the present invention. The user plane protocol stack illustrated in FIG. 10 is based on the user plane protocol stack as currently standardized for 3GPP 5G system according to current 3GPP standardization.

As is shown in FIG. 10, Ethernet (ETH), possibly with TSN extensions, is implemented in the E2E protocol layer. In case of integration of a 3GPP 5G system in an IEEE TSN system, Ethernet (ETH), possibly with TSN extensions, is implemented in the 3GPP PDU layer.

In the example of a user plane protocol stack as shown in FIG. 10, the aforementioned requirement that on each interface or reference point at least protocol can carry a time stamp (in the user plane data packet) means that, for example, one of the "5G-AN Protocol Layers" (e.g. SDAP), the GTP-U and the "5G UP Encapsulation" need to be able to transport a time stamp (in the user plane data packet).

It is to be noted that this does not imply or limit the scheduling to a hop-to-hop procedure, but scheduling in each hop could be parameterized in a centralized manner e.g. by pre-calculated schedules/forwarding time windows or on-the-fly calculated schedules according to the actual time-sensitive data packets in the system. This could include known, fixed delays or dynamic delays (e.g. with respect to load or packet size) in each node. This could leverage mechanisms like prioritization and pre-emption.

Figure 11:
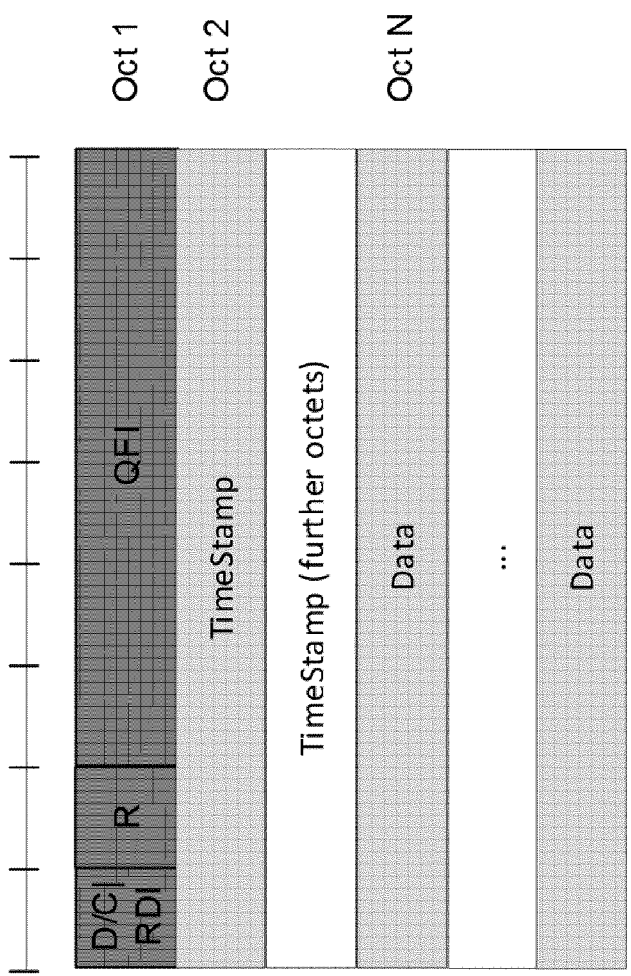
FIG. 11 shows a schematic diagram illustrating an example of a SDAP Data PDU format which is applicable according to exemplifying embodiments of the present invention, FIG. 12 (including FIG. 12(A) and FIG. 12(B)) shows a schematic diagram illustrating an example of a GTP-U Header format which is applicable according to exemplifying embodiments of the present invention.

FIG. 11 shows a schematic diagram illustrating an example of a SDAP Data PDU format which is applicable according to exemplifying embodiments of the present invention. That is, the thus illustrated protocol format represents an example of a protocol format according to exemplifying embodiments of the present invention, which is applicable on the 5G-Uu interface or reference point in case of integration of a 3GPP 5G system.

In the example of FIG. 11, the SDAP Data PDU header (which is based on the SDAP PDU Header in accordance with current 3GPP standardization) is shown as a combined view which is valid for downlink SDAP PDU with the RDI flag and/or uplink SDAP PDU with the D/C flag. In the SDAP Data PDU header according to exemplifying embodiments of the present invention, new octet(s) are inserted to transport the time stamp or corresponding time stamp data.

FIG. 12 (including FIG. 12(A) and FIG. 12(B)) shows a schematic diagram illustrating an example of a GTP-U Header format which is applicable according to exemplifying embodiments of the present invention. That is, the thus illustrated protocol format represents an example of a protocol format according to exemplifying embodiments of the present invention, which is applicable on the N3 interface or reference point in case of integration of a 3GPP 5G system.

In FIG. 12(A), an outline of the GTP-U Header in accordance with current 3GPP standardization is shown.

In FIG. 12(B), a Time Stamp Extension Header for GTP-U according to exemplifying embodiments of the present invention is shown. This extension header, which is to be included as an extension header in the standardized GTP-U Header shown in FIG. 12(A), comprises new octet(s) to transport the time stamp or corresponding time stamp data.

In the following, exemplifying embodiments of the present invention are described, in which the delivery-related parameter, upon which packet processing is effected/controlled, comprises (or is) a counter value of a cycle number in the user plane data packet.

Figure 13:
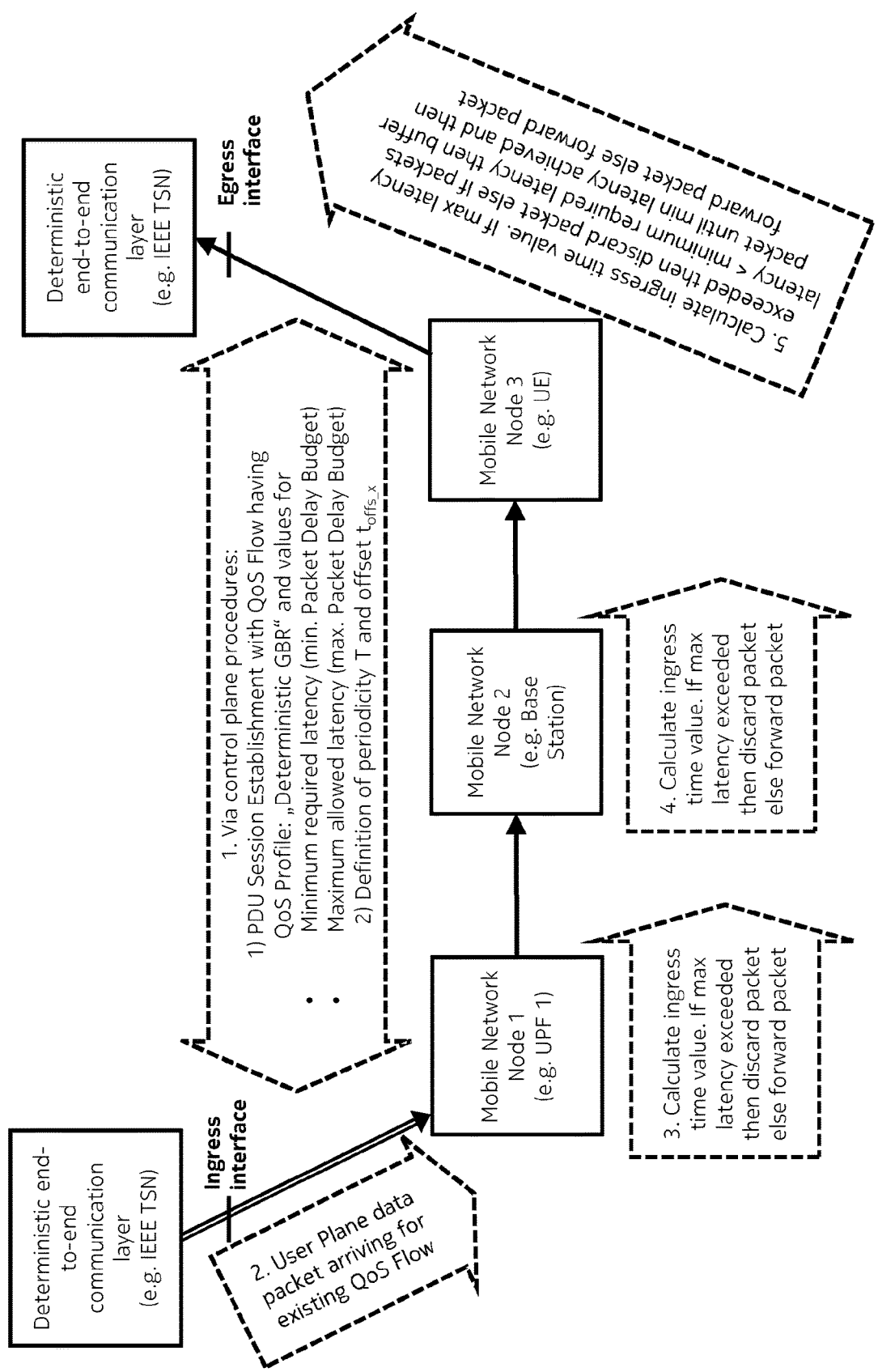
FIG. 13 shows a schematic diagram illustrating an example of a procedure for latency-bounded packet delivery according to exemplifying embodiments of the present invention.

FIG. 13 shows a schematic diagram illustrating an example of a procedure for latency-bounded packet delivery according to exemplifying embodiments of the present invention. The exemplary procedure of FIG. 13 is applicable to/in any one of the exemplary system architectures of FIGS. 3 and 4, respectively.

The exemplary procedure of FIG. 13 is illustrated under the assumption that an IEEE TSN network constitutes (a deterministic end-to-end communication layer/network of) the superordinate time-sensitive communication system, and a mobile network constitutes the subordinate mobile communication system being integrated in the superordinate time-sensitive communication system. Further, it is assumed that the mobile network has a UPF 1, a Base Station and a UE as user plane nodes being involved in a PDU session being managed by a control plane node such as the SMF. Still further, it is assumed that data of the IEEE TSN network is to be transported over the mobile network, wherein the data is required to be transported with bounded latency (or deterministic communication).

For the packet delivery according to the procedure of FIG. 13, communication in downlink direction is assumed, wherein the UPF connected to an external data network is the first node while the base station is an intermediate nodes and the UE is the last node of the mobile communication system. Otherwise, in the case of communication in uplink direction, the UE would be the first node, the base station would be an intermediate node and the UPF connected to an external data network would be the last node of the mobile communication system.

Further, it is assumed that data of the IEEE TSN network (also referred to as TSN data) is periodic data, which is characterized/featured by predefined periodicity and offset values for the delivery of user plane data packets including the TSN data. Accordingly, the present example is particularly applicable when the time-sensitive communication describes that there is a predefined periodicity value T where the messages/packets are to be delivered, e.g. a periodicity of 1 ms, and the flow has a predefined offset value $t_{offs\_x}$.

As shown in FIG. 13, the thus exemplified procedure comprises six operations/processes.

In a first operation/process, which can be performed by a session management node such as a SMF of the mobile network, a PDU session is established in the mobile network by at least one control plane node of the mobile network, i.e. via control plane procedures of the mobile network. In this regard, a PDU session is managed, e.g. by way of PDU session establishment with a QoS flow having a QoS profile of deterministic communication between the UPF 1 as the first node in the mobile network and the UE as the last node in the mobile network. The QoS profile of deterministic communication can for example be denoted as QoS profile "Deterministic GBR" having values by which minimum required latency (which can also be referred to as minimum packet delay budget) and maximum allowed latency (which can also be referred to as maximum packet delay budget) are defined for the delivery of user plane data packets via this QoS flow. The minimum required latency and the maximum allowed latency, which represent a defined time window for packet delivery, can be set in accordance with or depending on the data delivery requirements of the data to be transported, i.e. the TSN flow/stream which is to be mapped to or carried via the QoS profile of deterministic communication. Further, e.g. in the course of PDU session establishment, parameters/information on a periodicity, i.e. a predefined periodicity value T, and an parameters/information on a base/reference time may be (exchanged and) set/established.

In a second operation/process, a user plane data packet on the QoS flow having the QoS profile of deterministic communication (i.e. a user plane packet carrying data of a TSN flow/stream) is received at the UPF 1 as the first node in the mobile network from an ingress node in the TSN network, e.g. the TSN Translator (UP) or the TSN Bridge/End Station on the network side in FIG. 3. Here, it is assumed that the received user plane data packet includes a counter value of a cycle number (of the TSN data to be delivered/transported via the QoS flow), i.e. a counter value N.

In a third operation/process, the UPF 1 as the first node in the mobile network, when receiving the user plane data packet, calculates an ingress time value of the user plane data packet on the basis of the counter value (N) in the user plane data packet and predefined periodicity and offset values (T, $t_{offset\_x}$) for the delivery of user plane data packets. Then, the UPF 1 calculates the current delay (latency) in view of the current time. The thus calculated current delay (latency) is then checked with respect to the maximum allowed latency which is configured for the QoS profile of deterministic communication, to which the user plane data packet belongs. When the maximum allowed latency is not exceeded, the user plane data packet is forwarded to the next node in the mobile network on the session downstream side, wherein the included counter value is kept unchanged. Otherwise, when the maximum allowed latency is exceeded, the user plane data packet is discarded. In this case, a corresponding information regarding the packet discarding can be provided to the control plane or the TSN network.

In a fourth operation/process, the Base Station as the next node or an intermediate node in the mobile network functions as the UPF 1 in the third operation/process. Accordingly, reference is made to the description of the third operation/process above.

In a fifth operation/process, the UE as the last node in the mobile network, when receiving the user plane data packet from the previous node, i.e. the Base Station, calculates the ingress time value of the user plane data packet (like in the third and fourth operations/processes) so as to calculate the current delay (latency) in view of the current time. The thus calculated current delay (latency) is then checked with respect to the maximum allowed latency and the minimum required latency which are configured for the QoS profile of deterministic communication, to which the user plane data packet belongs. When the minimum required latency is not yet met/reached, the user plane data packet is buffered before forwarding/delivery to the egress node in the TSN network, e.g. the TSN Translator (Device) or the TSN Bridge/End Station on the device side in FIG. 3, until the minimum required latency is achieved. When the minimum required latency is met/reached and the maximum allowed latency is not exceeded, the user plane data packet is forwarded/delivered to an egress node in the TSN network, e.g. the TSN Translator (Device) or the TSN Bridge/End Station on the device side in FIG. 3. When the maximum allowed latency is exceeded, the user plane data packet is discarded. In this case, a corresponding information regarding the packet discarding can be provided to the control plane or the TSN network.

In the foregoing description, the counter value N indicates or represents a time relating to delivery/transport of the user plane data packet, and thus exemplifies a (delivery-related) counter value of a cycle number according to exemplifying embodiments of the present invention, and hence a (delivery-related) time attribute of the user plane data packet.

In the foregoing description, it is assumed that the counter value N is already included in the user plane data packet when arriving at the mobile network, i.e. the first node of the mobile network. In this case, the counter value N is set or defined by the TSN network based on the knowledge (or estimation) in which cycle the user plane data packet will be received at the UPF 1 as the first node of the mobile network.

However, it may also be the case that the user plane data packet does not yet include the counter value N when arriving at the mobile network, i.e. the first node of the mobile network. Accordingly, in this case, the above-illustrated procedure of FIG. 13 may have a further operation/process between the second and third operations/processes. Namely, similar to the third operation/process of FIG. 5, the UPF 1 as the first node in the mobile network may insert (or add or attach) the counter value N to the user plane data packet, and the UPF 1 may then forward the user plane data packet with the inserted (or added or attached) counter value N to the next node in the mobile network on a session downstream side. In this case, the UPF 1 as the first node sets or defines the counter value N based on the knowledge (or estimation) in which cycle the user plane data packet was received.

Generally speaking, the ingress time value (which may also be referred as calculated ingress time value) refers to a (calculated or estimated) ingress time or, in other words, ingress arrival time of the user plane data packet with respect to the mobile network. Namely, the counter value indicates a cycle in which the user plane data packet is (calculated or estimated to be) received at the ingress port of the mobile network.

As described above in connection with FIG. 6, the minimum packet delay budget (or the minimum required latency) and the maximum packet delay budget (or the maximum allowed latency) can be defined/calculated relative to different reference times. Accordingly, the ingress time can equally refer to, i.e. the calculated ingress time value ($T_{1\_(Calculated\ Rcvd)}$) can be calculated with respect to, either one of the actual arrival time of the packet at the ingress port ($T_{1\_(Actual\ Rcvd)}$)
the time when the receive window starts ($T_{1a\_RcvWindowStart}$)
the time in the middle of the receive window ($T_{1b\_RcvWindowCenter}$)
the time when the receive window ends ($T_{1c\_RcvWindowEnd}$)

For illustrative purposes, it may thus be assumed that the timing denoted by $T_{1\_(Actual\ Rcvd)}$ in FIG. 6 would here be replaced by a timing denoted by $T_{1\_(Calculated\ Rcvd)}$, i.e. the (calculated or estimated) ingress time value described here.

Figure 14:
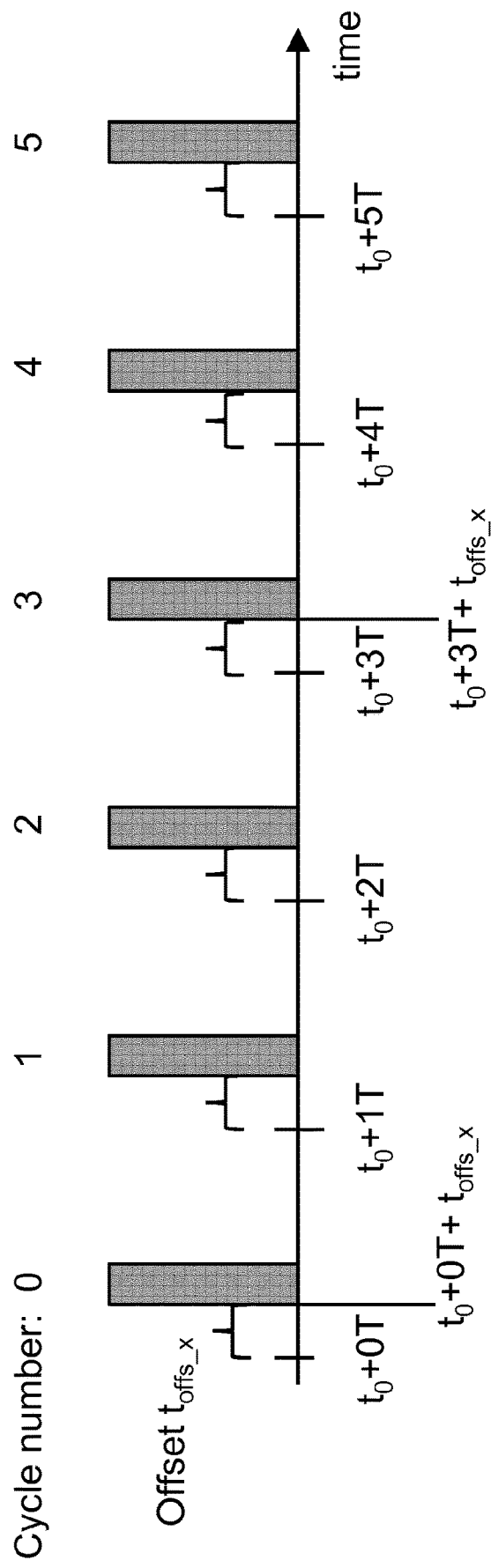
FIG. 14 shows a schematic diagram for explaining calculation of an ingress time value of a user plane data packet according to exemplifying embodiments of the present invention.

FIG. 14 shows a schematic diagram for explaining calculation of an ingress time value of a user plane data packet according to exemplifying embodiments of the present invention.

As is shown in FIG. 14, where the abscissa represents time, periodic TSN data (of one TSN flow/stream or one QoS flow) is provided, and is thus to be transported/delivered, in cycles. In FIG. 14, the periodic TSN data to be transported/delivered is indicated by grey blocks.

It can be seen that the (relevant) time of the TSN data of a respective user plane data packet can be calculated as an ingress time value of the user plane data packet on the basis of the counter value (N) in the user plane data packet and predefined periodicity and offset values (T, $t_{offset\_x}$) for the delivery of user plane data packets (of one TSN flow/stream or one QoS flow), namely as $t_0+N \cdot T+t_{offset\_x}$. Therein, $t_0$ represents a base/reference time.

It is to be noted that the periodicity T is a periodicity for the system or network (e.g. in the mobile network or in the TSN network), the base/reference signal to is a base/reference signal for the system or network (e.g. a reference time in the mobile network or in the TSN network), and the same base/reference time is thus used for different TSN flows/streams or QoS flows, while each TSN flow/stream or QoS flow has its own offset $t_{offset\_x}$. That is to say, T represents a system/network-specific periodicity value, to represents a system/network-specific base/reference signal, and $t_{offset\_x}$ represents a flow-specific offset value.

Although FIG. 14 exemplarily illustrates only data of one flow, there are usually multiple flows in practice, which have different offset values such that the data of the different flows do not overlap with each other.

Although FIG. 14 illustrates an exemplary case in which data is transmitted in every cycle, flows in practice may transmit data only in every second or fourth cycle, or the like. Here, as well, the ingress time value of the user plane data packet can be calculated on the basis of the counter value N, as described above.

Accordingly, the ingress time value calculated on the basis of the counter value (N) in the user plane data packet and predefined periodicity and offset values (T, $t_{offset\_x}$) for the delivery of user plane data packets exemplifies a (delivery-related) time attribute of the user plane data packet.

Figure 15:
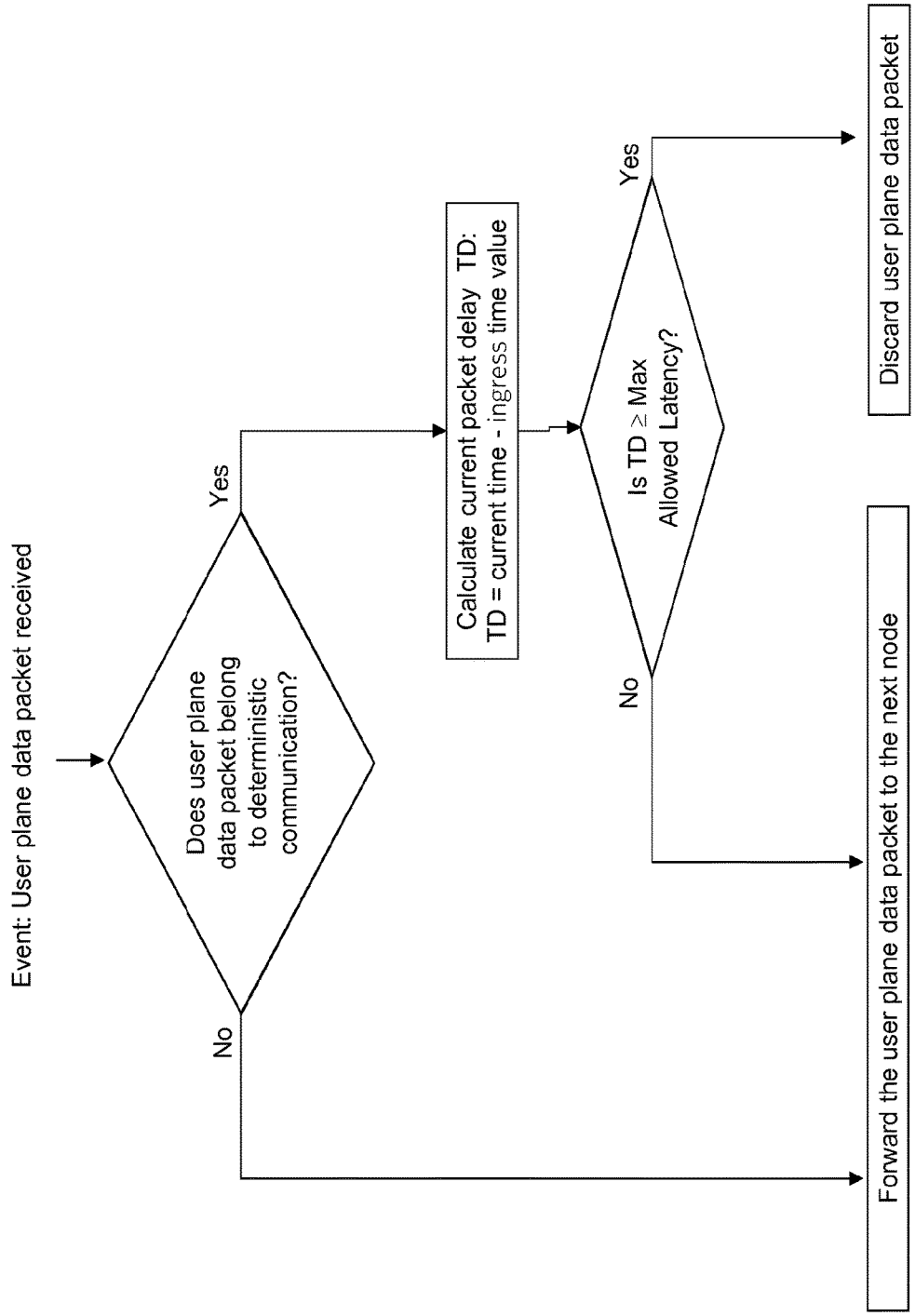
FIG. 15 shows a flowchart illustrating an example of a method, operable at a first node or an intermediate node on the user plane, according to exemplifying embodiments of the present invention.
Figure 16:
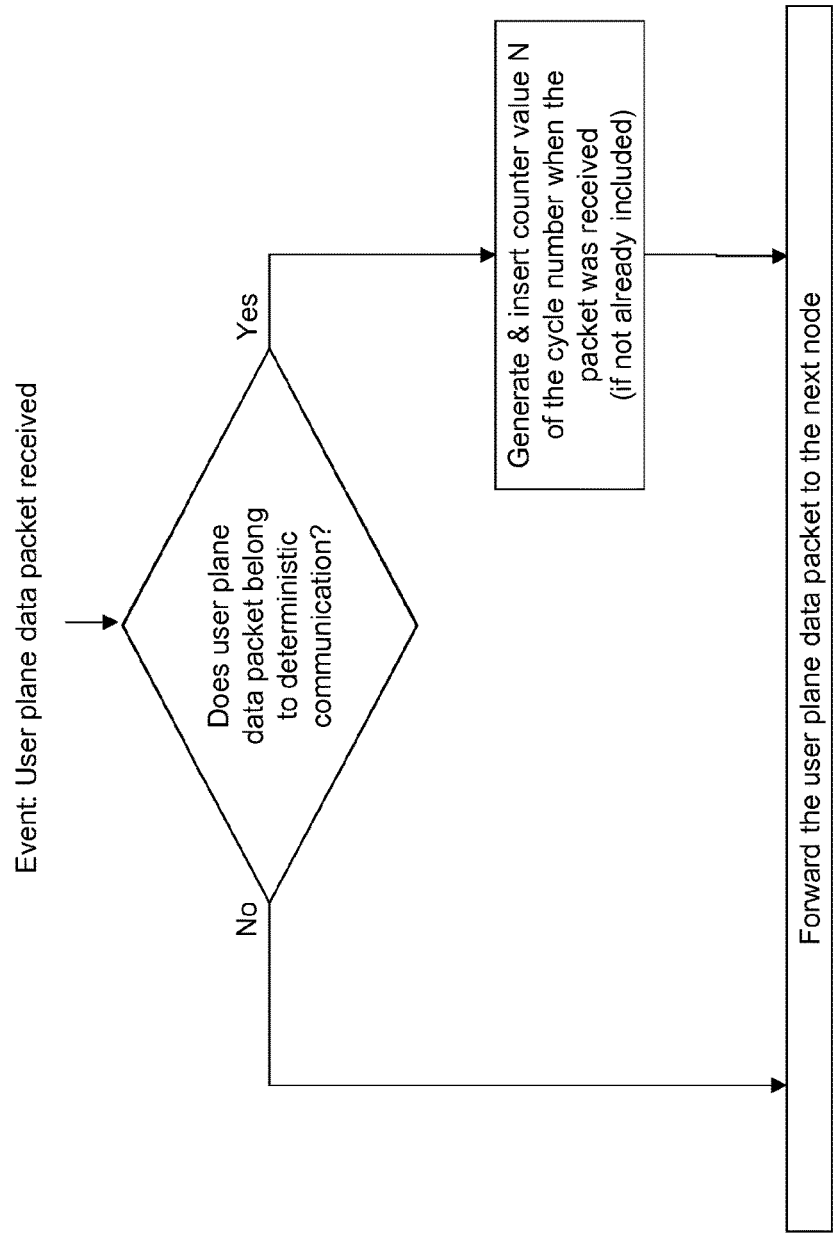
FIG. 16 shows a flowchart illustrating an example of a method, operable at a first node on the user plane, according to exemplifying embodiments of the present invention.

In the subsequent description of FIGS. 15 and 16, the counter value N indicates or represents a time relating to delivery/transport of the user plane data packet, and thus exemplifies a (delivery-related) counter value of a cycle number according to exemplifying embodiments of the present invention, and hence a (delivery-related) time attribute of the user plane data packet.

FIG. 15 shows a flowchart illustrating an example of a method, operable at a first node or an intermediate node on the user plane, according to exemplifying embodiments of the present invention. The method of FIG. 15 is operable at or by a network element, entity or function on the user plane, which represents a first node or an intermediate node in the mobile communication system, such as e.g. the UPF 1 (Mobile Network Node 1) or the Base Station (Mobile Network Node 2) according to FIG. 13, or the like.

As shown in FIG. 15, a method according to exemplifying embodiments of the present invention comprises, when a user plane data packet is received (e.g. from an ingress node of the time-sensitive communication system or a previous user plane node in the mobile communication system node towards a session upstream side), an operation of packet processing in accordance with the quality-of-service, QoS, profile of deterministic communication, wherein the packet processing operation comprises: calculating an ingress time value of the user plane data packet (as described above), calculating a current packet delay representing a difference between a current time and the ingress time value, forwarding the user plane data packet, in which the counter value is inserted, without changing the counter value, to a next user plane node in the mobile communication system towards a session downstream side, if the calculated current packet delay is smaller than the defined maximum allowed latency, and discarding the user plane data packet, if the calculated current packet delay is equal to or larger than the defined maximum allowed latency.

According to exemplifying embodiments of the present invention, the method may also comprise checking whether the user plane data packet belongs to deterministic communication. Such check could be effected in consideration of the QoS flow on/in which the user plane data packet is carried, or to which the user plane data packet belongs. Accordingly, a positive result can be attained when the user plane data packet is received on/in the QoS profile of deterministic communication (e.g. the QoS profile "Deterministic GBR"), and a negative result is attained otherwise. While the user plane data packet may be processed in any case, the aforementioned calculating, forwarding and discarding operations are performed only for a user plane data packet belonging to deterministic communication, while a user plane data packet not belonging to deterministic communication is just forwarded as it is.

As an alternative to the method of FIG. 15, according to exemplifying embodiments of the present invention, a method according to exemplifying embodiments of the present invention may comprise, when the user plane data packet is received, an operation of packet processing in accordance with the quality-of-service, QoS, profile of deterministic communication, wherein the packet processing operation comprises: forwarding the user plane data packet, in which a counter value is inserted, without changing the counter value, to a next user plane node in the mobile communication system towards a session downstream side.

FIG. 16 shows a flowchart illustrating an example of a method, operable at a first node on the user plane, according to exemplifying embodiments of the present invention. The method of FIG. 16 is operable at or by a network element, entity or function on the user plane, which represents a first node in the mobile communication system, such as e.g. the UPF 1 (Mobile Network Node 1) according to FIG. 13, or the like.

As shown in FIG. 16, a method according to exemplifying embodiments of the present invention comprises, when a user plane data packet is received from an ingress node of the time-sensitive communication system, an operation of packet processing in accordance with the quality-of-service, QoS, profile of deterministic communication, wherein the packet processing operation comprises: inserting, in the user plane data packet, a counter value of a cycle number when the user plane data packet is received, and forwarding the user plane data packet, in which the counter value is inserted, to a next user plane node in the mobile communication system towards a session downstream side. Specifically, the inserting of the counter value may take place if such counter value is not already included in the user plane data packet.

According to exemplifying embodiments of the present invention, the method may also comprise checking whether the user plane data packet belongs to deterministic communication. Such check could be effected in consideration of the QoS flow on/in which the user plane data packet is carried, or to which the user plane data packet belongs. Accordingly, a positive result can be attained when the user plane data packet is received on/in the QoS profile of deterministic communication (e.g. the QoS profile "Deterministic GBR"), and a negative result is attained otherwise. While the user plane data packet may be forwarded towards a session downstream side in any case, the counter value is (generated and) inserted only for a user plane data packet belonging to deterministic communication.

As evident from the above description of alternative procedures in connection with FIG. 13, according to exemplifying embodiments of the present invention, the first node and any intermediate node of the mobile network may both implement the method according to FIG. 15, or the first node of the mobile network may implement the method according to FIG. 16 while the first node and/or any intermediate node of the mobile network may implement the method according to FIG. 15.

Figure 17:
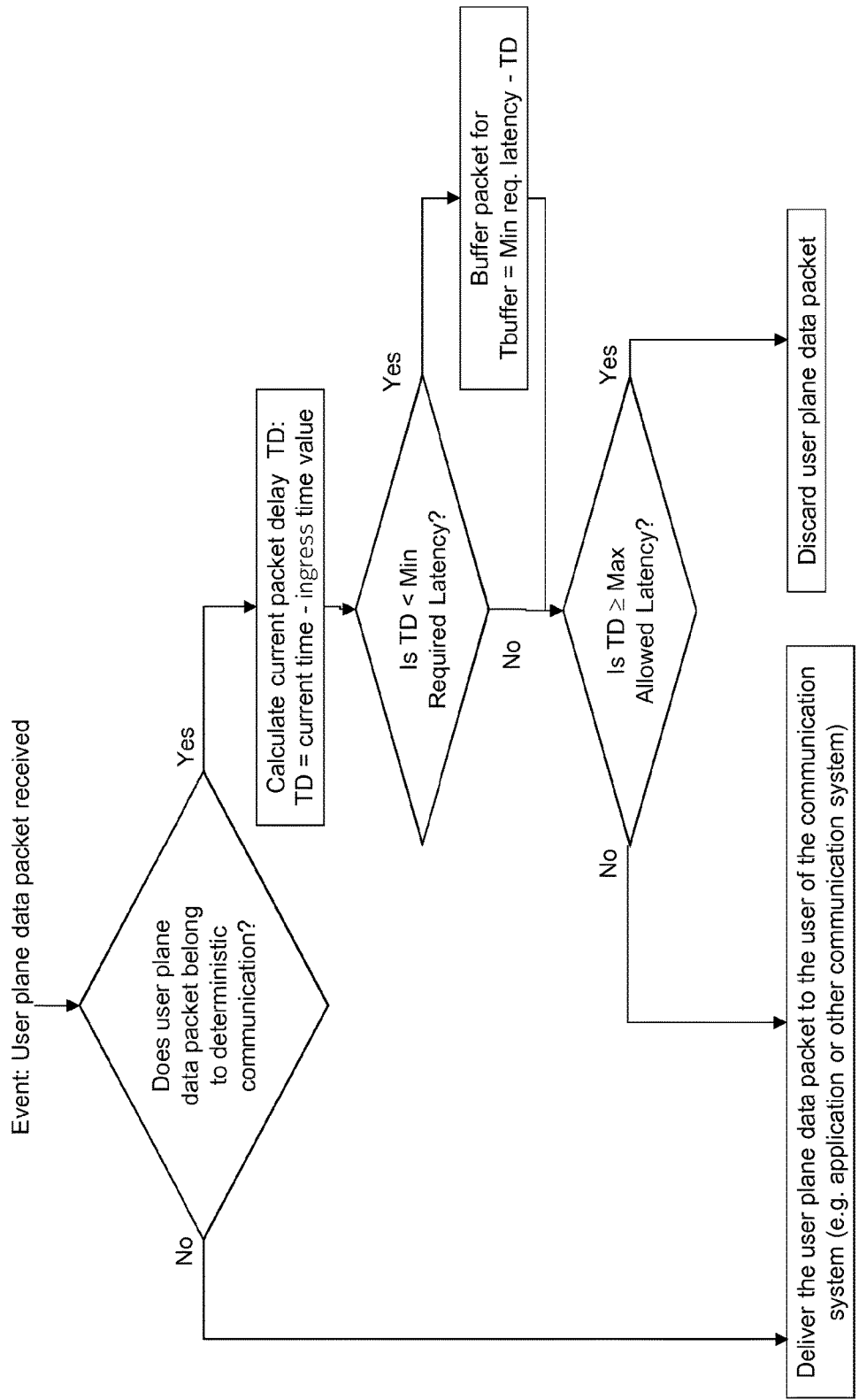
FIG. 17 shows a flowchart illustrating an example of a method, operable at a last node on the user plane, according to exemplifying embodiments of the present invention.

FIG. 17 shows a flowchart illustrating an example of a method, operable at a last node on the user plane, according to exemplifying embodiments of the present invention. The method of FIG. 17 is operable at or by a network element, entity or function on the user plane, which represents a last node in the mobile communication system, such as e.g. the UE (Mobile Network Node 3) according to FIG. 13, or the like.

As shown in FIG. 17, a method according to exemplifying embodiments of the present invention comprises, when the user plane data packet is received from a previous user plane node in the mobile communication system node towards a session upstream side, an operation of packet processing in accordance with the quality-of-service, QoS, profile of deterministic communication, wherein the packet processing operation comprises: calculating an ingress time value of the user plane data packet (as described above), calculating a current packet delay representing a difference between a current time and the ingress time value, buffering the user plane data packet for a buffering time representing a difference between the defined minimum required latency and the current time, if the calculated current packet delay is smaller than the defined minimum required latency, forwarding the user plane data packet to an egress node of the time-sensitive communication system, if the calculated current packet delay is smaller than the defined maximum allowed latency, and discarding the user plane data packet, if the calculated current packet delay is equal to or larger than the defined maximum allowed latency.

Similar to the method of FIG. 15, according to exemplifying embodiments of the present invention, the method may also comprise checking whether the user plane data packet belongs to deterministic communication, as described above. While the user plane data packet may be processed in any case, the aforementioned calculating, buffering, forwarding and discarding operations are performed only for a user plane data packet belonging to deterministic communication, while a user plane data packet not belonging to deterministic communication is just forwarded as it is.

According to exemplary embodiments of the present invention, the forwarding (as described in connection with any one of FIGS. 5 to 9 and 13 to 17) can be realized by any well-known forwarding process, including queuing, scheduling based e.g. on priorities and context information, or the like.

According to exemplary embodiments of the present invention, in the forwarding, a forwarding time may be controlled based on one or more of a latency budget, which is based on a relationship between a current time and the defined maximum allowed latency and/or the defined minimum required latency, and an expected latency, which represents an expected delay for delivery of the user plane data packet to an egress node of the time-sensitive communication system. This is applicable to any forwarding operation, such as those described above for the third to fifth operations/processes according to FIG. 5, the third to fourth operations/processes according to FIG. 13, and the forwarding operations according to any one of FIGS. 7 to 9 and 15 to 17.

That is to say, the forwarding process may (in addition to what has been described above with respect to FIGS. 5 to 9 and 13 to 17) use information about the expected delay in the following hops. The information about the expected delay of the following hops can be based on context information about the route and characteristics of the next hops, and/or can based on measurements. With this knowledge, packets with low remaining time budget (i.e. time critical packets) can be sent before packets with a relaxed time budget (i.e. less time critical or time uncritical packets). Such a procedure can avoid packet loss, and can also relax the performance requirements of critical (e.g. bottleneck) nodes.

In view of exemplary embodiments of the present invention, according to which a counter value is used, the applicable user plane protocol/s shall be able to transport the counter value (in the user plane data packet). This requires that on each interface or reference point at least one protocol can carry such a counter value (in the user plane data packet). In this regard, reference is made to the above teaching in connection with FIGS. 10 to 12, relating to carrying the time stamp, which equally applies for carrying the counter value.

As described above, the packet handling differs between individual nodes involved in the PDU session comprising the QoS profile of deterministic communication, depending on their position in the mobile network with respect to the packet delivery direction. In brief, the individual packet handling properties can be summarized as follows.

The first node (and any intermediate node) shall calculate an ingress time value of the user plane data packet, and can already discard a user plane data packet in case the data packet cannot be delivered inside the required bounded latency, else the packet is forwarded to the next node. For further details, reference is made to the third and fourth operations/processes according to FIG. 13 and FIG. 15.

The last node shall buffer the packet in case the minimum required latency is not met/reached until the minimum required latency is met/reached. The packet shall be discarded in case the latency of the packet is larger than the maximum allowed latency, else the packet shall be delivered to the user of the communication system. For further details, reference is made to the fifth operation/process according to FIG. 13 and FIG. 17.

It is to be noted that applicability of the teaching according to exemplifying embodiments of the present invention, as described e.g. with regard to FIGS. 5 and 6 and FIG. 13, is independent of the network configuration of the mobile communication system and the time-sensitive communication system. Specifically, the mobile communication system can have more or less than the three nodes (which are denoted as the first node, the intermediate node and the last node herein). For example, the UPF and the Base Station/(R)AN may be merged into one node (e.g. a co-located UPF/gNB, with gNB exemplifying the Base Station/(R)AN). In that case, the system has only two nodes, the UE and the co-located UPF/gNB. If so, the co-located UPF/gNB may exhibit the above-described functionality of the first node for communication in downlink direction or the above-described functionality of the last node for communication in uplink direction, while the above-described functionality of the intermediate node is omitted. Alternatively, the above-described functionalities of the first/last node and the intermediate node can be implemented (at the different logical entities) within the collocated UPF/gNB. In other implementations, there may be more than three nodes, e.g. besides the UE and the gNB, there could be more than two UPFs (as illustrated in FIG. 5). This could be the case e.g. in a roaming scenario, where one UPF is in the home network, one UPF is in the visited network, and one UPF acts as Edge Cloud, for example.

As described above, exemplary embodiments of the present invention establish, define or use specific QoS profile which is dedicated for deterministic communication (i.e. latency-bounded or time-sensitive packet delivery) in a mobile communication system. This QoS profile of deterministic communication can exemplarily be denoted as "Deterministic GBR", as used herein, but can be named differently, as well. Irrespective of its denomination, this QoS profile of deterministic communication constitutes an additional (novel) QoS profile in 3GPP.

In this regard, it is to be noted that 3GPP currently defined only three resource types, namely
GBR (Guaranteed Bit Rate)
Delay critical GBR
Non-GBR.

By exemplifying embodiments of the present invention, an additional (novel) resource type is introduced, which could be denoted as
"Deterministic GBR"

For this resource type, the additional (novel) QoS profile of deterministic communication according to exemplifying embodiments of the present invention includes information on
minimum required latency (min. Packet Delay Budget)
maximum allowed latency (max. Packet Delay Budget)

By virtue of exemplifying embodiments of the present invention, as evident from the above, latency-bounded packet delivery in a mobile communication system, particularly in a mobile communication system (or mobile networking) being integrated in a time-sensitive communication system (or time-sensitive networking), can be enabled/realized. Thereby, a measure/mechanism is provided for a mobile communication system to allow latency-bounded packet delivery, i.e. to deliver a packet in a defined time window so as to comply with packet delivery requirements/constraints of the time-sensitive communication system. In latency-bounded packet delivery according to exemplifying embodiments of the present invention, a (delivery-related) parameter in a user plane packet is used.

According to exemplifying embodiments of the present invention, integration of a mobile communication system (or mobile networking) in a time-sensitive communication system (or time-sensitive networking) can be enabled/realized. As an example, a 3GPP-standardized communication system, such as a 5G system, can be integrated in an IEEE-standardized communication system, such as an Ethernet network, such that the required support of deterministic communication or communication services in 3GPP communication systems for Release-16 is achieved.

According to exemplifying embodiments of the present invention, it can for example be achieved that
mobile networks, e.g. the 3GPP 5G systems, support deterministic communication, and/or
there are procedures in 3GPP for the user plane handling to deliver a user plane data packet with bounded latency, i.e. in a defined time window, preferably in view of information on the deterministic requirements which are typically available in industrial networks, e.g. in networks supporting IEEE TSN, and/or
a 3GPP QoS profile for deterministic communication (traffic) is established, and/or a mechanism is established to allow latency-bounded packet delivery, i.e. to deliver a packet with a latency larger than a minimum required latency but smaller than a maximum allowed latency.

Accordingly, TSN data can be delivered/transported via a 3GPP system, and latency-bounded packet delivery/transport is effected/controlled by using (delivery-related) parameters, such as e.g. time stamps or counter values of cycle numbers, in the user plane data packets.

Amongst others, the teaching according to exemplifying embodiments of the present invention is beneficial or effective in that not only the timing for the next hop (e.g. when to schedule in a periodic system) is considered but the timed delivery over multiple hops is taken into account in packet delivery, and not only static delay budgets are considered but the actual delay (latency) is taken into account in packet delivery.

The above-described methods, procedures and functions may be implemented by respective functional elements, entities, modules, units, processors, or the like, as described below.

While in the foregoing exemplifying embodiments of the present invention are described mainly with reference to methods, procedures and functions, corresponding exemplifying embodiments of the present invention also cover respective apparatuses, entities, modules, units, network nodes and/or systems, including both software and/or hardware thereof.

Respective exemplifying embodiments of the present invention are described below referring to FIGS. 18 and 19, while for the sake of brevity reference is made to the detailed description of respective corresponding configurations/set-ups, schemes, methods and functionality, principles and operations according to FIGS. 1 to 9 and 13 to 17.

Figure 18:
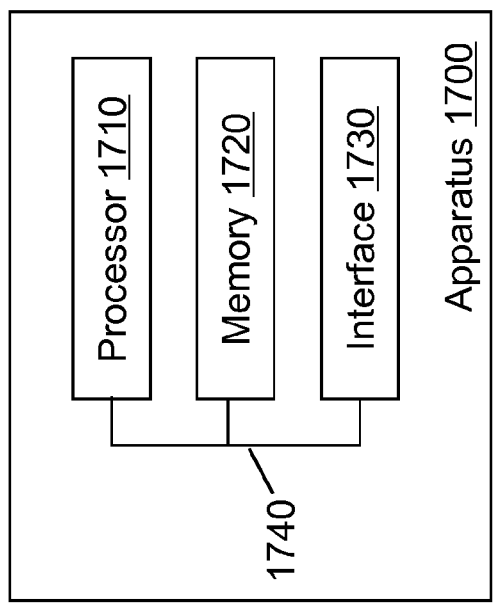
FIG. 18 shows a schematic diagram illustrating an example of a structure of apparatuses according to exemplifying embodiments of the present invention.
Figure 19:
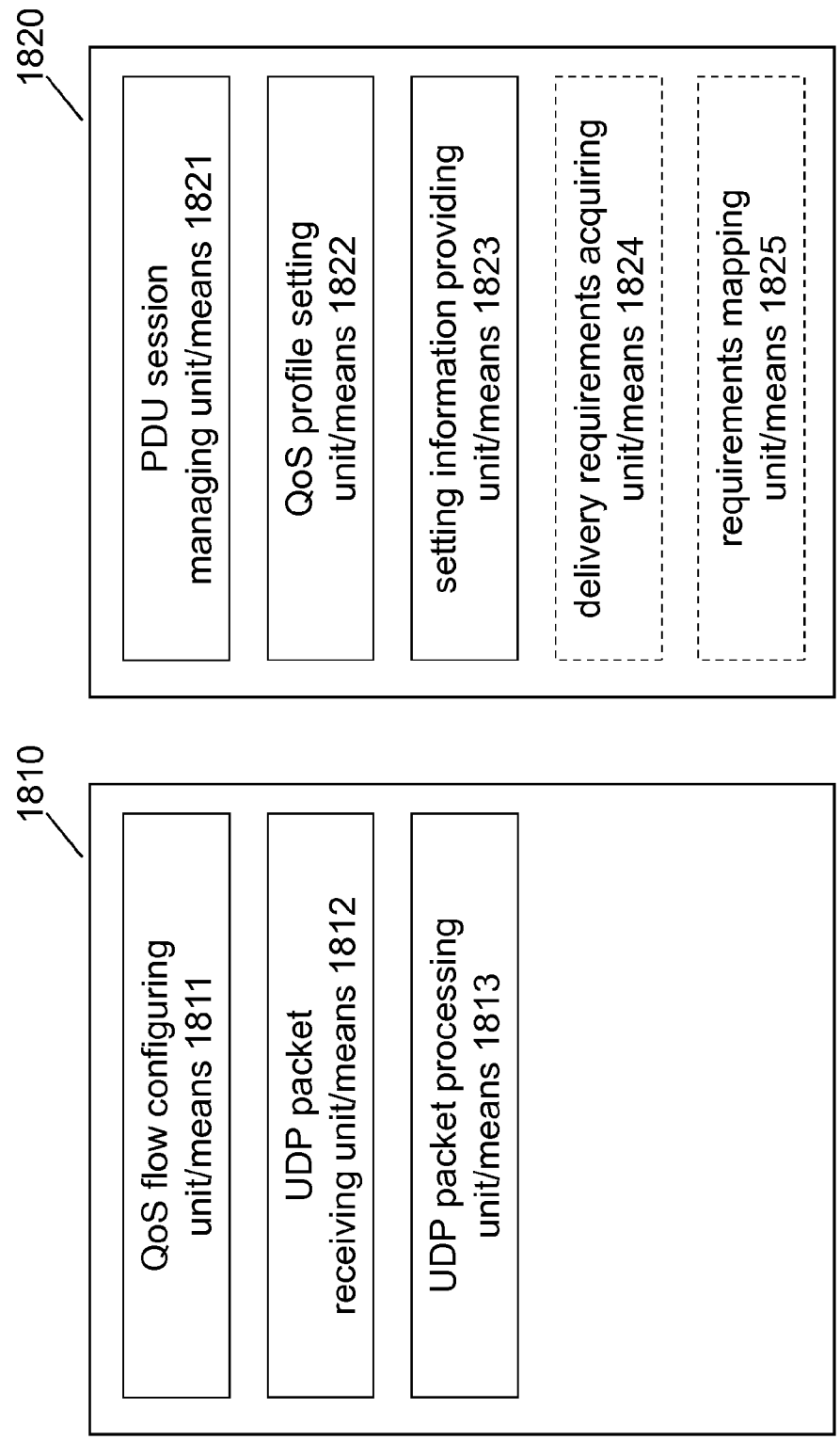
FIG. 19 shows a schematic diagram illustrating an example of a functional structure of apparatuses according to exemplifying embodiments of the present invention.

In FIGS. 18 and 19, the blocks are basically configured to perform respective methods, procedures and/or functions as described above. The entirety of blocks are basically configured to perform the methods, procedures and/or functions as described above, respectively. With respect to FIGS. 19 and 19, it is to be noted that the individual blocks are meant to illustrate respective functional blocks implementing a respective function, process or procedure, respectively. Such functional blocks are implementation-independent, i.e. may be implemented by means of any kind of hardware or software or combination thereof, respectively.

Further, in FIGS. 18 and 19, only those functional blocks are illustrated, which relate to any one of the above-described methods, procedures and/or functions. A skilled person will acknowledge the presence of any other conventional functional blocks required for an operation of respective structural arrangements, such as e.g. a power supply, a central processing unit, respective memories or the like. Among others, one or more memories are provided for storing programs or program instructions for controlling or enabling the individual functional entities or any combination thereof to operate as described herein in relation to exemplifying embodiments.

FIG. 19 shows a schematic diagram illustrating an example of a structure of apparatuses according to exemplifying embodiments of the present invention. Herein, an apparatus can represent a device or a function, i.e. a structural device implementing a specific network element, entity or function or the functionality thereof as such.

As indicated in FIG. 19, according to exemplifying embodiments of the present invention, an apparatus 1700 may comprise at least one processor 1710 and at least one memory 1720 (and possibly also at least one interface 1730), which may be operationally connected or coupled, for example by a bus 1740 or the like, respectively.

The processor 1710 and/or the interface 1730 of the apparatus 1700 may also include a modem or the like to facilitate communication over a (hardwire or wireless) link, respectively. The interface 1730 of the apparatus 1700 may include a suitable transmitter, receiver or transceiver connected or coupled to one or more antennas, antenna units, such as antenna arrays or communication facilities or means for (hardwire or wireless) communications with the linked, coupled or connected device(s), respectively. The interface 1730 of the apparatus 1700 is generally configured to communicate with at least one other apparatus, device, node or entity (in particular, the interface thereof).

The memory 1720 of the apparatus 1700 may represent a (non-transitory/tangible) storage medium and store respective software, programs, program products, macros or applets, etc. or parts of them, which may be assumed to comprise program instructions or computer program code that, when executed by the respective processor, enables the respective electronic device or apparatus to operate in accordance with the exemplifying embodiments of the present invention. Further, the memory 1720 of the apparatus 1700 may (comprise a database to) store any data, information, or the like, which is used in the operation of the apparatus. For example, the memory 620 may represent or implement a buffer for buffering UL data, as described above.

In general terms, respective apparatuses (and/or parts thereof) may represent means for performing respective operations and/or exhibiting respective functionalities, and/or the respective devices (and/or parts thereof) may have functions for performing respective operations and/or exhibiting respective functionalities.

In view of the above, the thus illustrated apparatus 1700 is suitable for use in practicing one or more of the exemplifying embodiments of the present invention, as described herein.

When in the subsequent description it is stated that the processor (or some other means) is configured to perform some function, this is to be construed to be equivalent to a description stating that a (i.e. at least one) processor or corresponding circuitry, potentially in cooperation with a computer program code stored in the memory of the respective apparatus or otherwise available (it should be appreciated that the memory may also be an external memory or provided/realized by a cloud service or the like), is configured to cause the apparatus to perform at least the thus mentioned function.

According to exemplifying embodiments of the present invention, the thus illustrated apparatus 1700 may represent or realize/embody a (part of a) network element, entity or function on the control plane. Specifically, the apparatus 1700 may for example be a (part of a) a SMF according to FIG. 3, CPFs according to FIG. 4, or the like. Hence, the apparatus 1700 may be configured to perform a procedure and/or exhibit a functionality and/or implement a mechanism, as described for the control plane, in any one of FIGS. 1, 3, 4 and 5.

Accordingly, the apparatus 1700 may be caused or the apparatus 1700 or its at least one processor 1710 (possibly together with computer program code stored in its at least one memory 1720), in its most basic form, is configured to manage a packet data unit session in a mobile communication system, said packet data unit session comprising a quality-of-service flow for delivery of user plane data packets including data of a time-sensitive communication system, to set a quality-of-service profile of deterministic communication, in which minimum required latency and maximum allowed latency for delivery of user plane data packets are defined, for the quality-of-service flow within the managed packet data unit session, and to provide setting information of the set quality-of-service profile of deterministic communication for user plane nodes involved in the managed packet data unit session in the mobile communication system, said setting information enabling configuration of the quality-of-service flow within the packet data unit session such that a user plane data packet in accordance with the quality-of-service profile of deterministic communication is processed by using a delivery-related parameter in the user plane data packet, said delivery-related parameter being indicative of a time attribute of the user plane data packet.

According to exemplifying embodiments of the present invention, the thus illustrated apparatus 1700 may represent or realize/embody a (part of a) network element, entity or function on the user plane. Specifically, the apparatus 1700 may for example be a (part of a) UE, a (R)AN, an UPF according to FIG. 3, any one of a UE, a base station, an UPF 1, an UPF 2 according to FIG. 4, or the like. Hence, the apparatus 1700 may be configured to perform a procedure and/or exhibit a functionality and/or implement a mechanism, as described for the user plane, in any one of FIGS. 2 to 9 and 13 to 17.

Accordingly, the apparatus 1700 may be caused or the apparatus 1700 or its at least one processor 1710 (possibly together with computer program code stored in its at least one memory 1720), in its most basic form, is configured to configure a quality-of-service flow within a packet data unit session in a mobile communication system by a quality-of-service profile of deterministic communication based on setting information of the quality-of-service profile of deterministic communication, in which minimum required latency and maximum allowed latency for delivery of user plane data packets are defined, said quality-of-service flow being for delivery of user plane data packets including data of a time-sensitive communication system, to receive a user plane data packet in the configured quality-of-service flow within the packet data unit session, and to process the received user plane data packet in accordance with the quality-of-service profile of deterministic communication by using a delivery-related parameter in the user plane data packet, said delivery-related parameter being indicative of a time attribute of the user plane data packet.

As mentioned above, an apparatus according to exemplifying embodiments of the present invention may be structured by comprising respective units or means for performing corresponding operations, procedures and/or functions. For example, such units or means may be implemented/realized on the basis of an apparatus structure, as exemplified in FIG. 18, i.e. by one or more processors 1710, one or more memories 1720, one or more interfaces 1730, or any combination thereof.

FIG. 19 shows a schematic diagram illustrating another example of a functional structure of an apparatus according to exemplifying embodiments of the present invention.

It is to be noted that the individual apparatuses shown in FIG. 19 are inherently independent from each other but could be operable to interwork, i.e. exemplifying embodiments of the present invention cover any one of these apparatuses alone or any combination of such apparatuses (including one or more of any one of these apparatuses).

As shown in FIG. 19, an apparatus 1810 according to exemplifying embodiments of the present invention may represent or realize/embody a (part of a) network element, entity or function on the user plane. Specifically, the apparatus 1700 may for example be a (part of a) UE, a (R)AN, an UPF according to FIG. 3, any one of a UE, a base station, an UPF 1, an UPF 2 according to FIG. 4, or the like. Such apparatus may comprise (at least) a unit or means (denoted as QoS flow configuring unit/means 1811) for configuring a quality-of-service flow within a packet data unit session in a mobile communication system by a quality-of-service profile of deterministic communication based on setting information of the quality-of-service profile of deterministic communication, in which minimum required latency and maximum allowed latency for delivery of user plane data packets are defined, said quality-of-service flow being for delivery of user plane data packets including data of a time-sensitive communication system, a unit or means (denoted as UDP packet receiving unit/means 1812) for receiving a user plane data packet in the configured quality-of-service flow within the packet data unit session, and a unit or means (denoted as UDP packet processing unit/means 1813) for processing the received user plane data packet in accordance with the quality-of-service profile of deterministic communication by using a delivery-related parameter in the user plane data packet, said delivery-related parameter being indicative of a time attribute of the user plane data packet.

As shown in FIG. 19, an apparatus 1820 according to exemplifying embodiments of the present invention may represent or realize/embody a (part of a) network element, entity or function on the control plane. Specifically, the apparatus 1700 may for example be a (part of a) a SMF according to FIG. 3, CPFs according to FIG. 4, or the like. Such apparatus may comprise (at least) a unit or means (denoted as PDU session managing unit/means 1821) for managing a packet data unit session in a mobile communication system, said packet data unit session comprising a quality-of-service flow for delivery of user plane data packets including data of a time-sensitive communication system, a unit or means (denoted as QoS profile setting unit/means 1822) for setting a quality-of-service profile of deterministic communication, in which minimum required latency and maximum allowed latency for delivery of user plane data packets are defined, for the quality-of-service flow within the managed packet data unit session, and a unit or means (denoted as setting information providing unit/means 1823) for providing setting information of the set quality-of-service profile of deterministic communication for user plane nodes involved in the managed packet data unit session in the mobile communication system, said setting information enabling configuration of the quality-of-service flow within the packet data unit session such that a user plane data packet in accordance with the quality-of-service profile of deterministic communication is processed by using a delivery-related parameter in the user plane data packet, said delivery-related parameter being indicative of a time attribute of the user plane data packet.

As evident from the above, the apparatus 1820 may optionally also comprise a unit or means (denoted as delivery requirements acquiring unit/means 1824) for acquiring delivery requirements of the data of the time-sensitive communication system from a control node of the time-sensitive communication system, a unit or means (denoted as requirements mapping unit/means 1825) for mapping the acquired delivery requirements of the data of the time-sensitive communication system on quality-of-service requirements of the mobile communication system. Accordingly, the quality-of-service profile of deterministic communication may be set in accordance with the acquired delivery requirements of the data of the time-sensitive communication system and/or the mapped quality-of-service requirements of the mobile communication system.

For further details regarding the operability/functionality of the individual apparatuses (or units/means thereof) according to exemplifying embodiments of the present invention, reference is made to the above description in connection with any one of FIGS. 1 to 17, respectively.

According to exemplifying embodiments of the present invention, any one of the (at least one) processor, the (at least one) memory and the (at least one) interface, as well as any one of the illustrated units/means, may be implemented as individual modules, chips, chipsets, circuitries or the like, or one or more of them can be implemented as a common module, chip, chipset, circuitry or the like, respectively.

According to exemplifying embodiments of the present invention, a system may comprise any conceivable combination of any depicted or described apparatuses and other network elements or functional entities, which are configured to cooperate as described above.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Such software may be software code independent and can be specified using any known or future developed programming language, such as e.g. Java, C++, C, and Assembler, as long as the functionality defined by the method steps is preserved. Such hardware may be hardware type independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components. A device/apparatus may be represented by a semiconductor chip, a chipset, or a (hardware) module comprising such chip or chipset; this, however, does not exclude the possibility that a functionality of a device/apparatus or module, instead of being hardware implemented, be implemented as software in a (software) module such as a computer program or a computer program product comprising executable software code portions for execution/being run on a processor. A device may be regarded as a device/apparatus or as an assembly of more than one device/apparatus, whether functionally in cooperation with each other or functionally independently of each other but in a same device housing, for example.

Apparatuses and/or units/means or parts thereof can be implemented as individual devices, but this does not exclude that they may be implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

The present invention also covers any conceivable combination of method steps and operations described above, and any conceivable combination of nodes, apparatuses, modules or elements described above, as long as the above-described concepts of methodology and structural arrangement are applicable.

In view of the above, there are provided measures for enabling/realizing latency-bounded packet delivery in a mobile communication system, particularly in a mobile communication system (or mobile networking) being integrated in a time-sensitive communication system (or time-sensitive networking). Such measures exemplarily comprise that a quality-of-service flow within a packet data unit session in a mobile communication system is configured by a quality-of-service profile of deterministic communication based on setting information of the quality-of-service profile of deterministic communication, in which minimum required latency and maximum allowed latency for delivery of user plane data packets are defined, said quality-of-service flow being for delivery of user plane data packets including data of a time-sensitive communication system, a user plane data packet is received in the configured quality-of-service flow within the packet data unit session, and the received user plane data packet is processed in accordance with the quality-of-service profile of deterministic communication.

Even though the invention is described above with reference to the examples according to the accompanying drawings, it is to be understood that the invention is not restricted thereto. Rather, it is apparent to those skilled in the art that the present invention can be modified in many ways without departing from the scope of the inventive idea as disclosed herein.

LIST OF ACRONYMS AND ABBREVIATIONS

3GPP 3rd Generation Partnership Project
5G 5th Generation
5G-AN 5th Generation Access Network
AF Application Function
AMF Access and Mobility Management Function
CP Control Plane
CNC Centralized Network Configuration
CPF Control Plane Function
CUC Centralized User Configuration
DN Data Network
E2E End-to-End
ETH Ethernet
GBR Guaranteed Bit Rate
GTP GPRS Tunneling Protocol
GTP-U GPRS Tunneling Protocol User Plane
IEEE Institute of Electrical and Electronics Engineers
IoT Internet of Things
IP Internet Protocol
L1/2 Layer 1/2
MAC Medium Access Control
NEF Network Exposure Function
PDCP Packet Data Convergence Protocol
PDU Packet Data Unit
PHY Physical Layer
QoS Quality-of-Service
SDAP Service Data Adaptation Protocol
SMF Session Management Function
TSN Time-Sensitive Networking
PCF Policy Control Function
(R)AN (Radio) Access Network
RLC Radio Link Control
UDM Unified Data Management
UDP User Datagram Protocol
UE User Equipment
UP User Plane
UPF User Plane Function

The invention claimed is:
1. A method, comprising:
configuring, by a user plane node of a mobile communication system, a quality-of-service flow within a packet data unit session in the mobile communication system by using a quality-of-service profile of deterministic communication based on setting information of the quality-of-service profile of deterministic communica- tion, in which minimum required latency and maximum allowed latency for delivery of user plane data packets are defined, said quality-of-service flow being for delivery of user plane data packets including data of a time-sensitive communication system, receiving, by the user plane node from an ingress node of the of the time-sensitive communication system, a user plane data packet in the configured quality-of-service flow within the packet data unit session, and processing, by the user plane node, the received user plane data packet in accordance with the quality-of-service profile of deterministic communication by using a delivery-related parameter in the user plane data packet, said delivery-related parameter being indicative of a time attribute of the user plane data packet, wherein the processing of the received user plane data packet comprises:

inserting, by the user plane node, in the user plane data packet, a time stamp indicating an ingress arrival time when the user plane data packet is received by the mobile communication system, wherein the delivery-related parameter comprises the time stamp, and forwarding, by the user plane node, the user plane data packet, in which the time stamp is inserted, to a next user plane node in the mobile communication system towards a session downstream side.

2. The method according to claim 1, further comprising:
receiving, at the next user plane node the user plane data packet forwarded by the user plane node; and forwarding, by the next user plane node the user plane data packet, in which the time stamp is inserted, without changing the time stamp, to a next user plane node in the mobile communication system towards the session downstream side.

3. The method according to claim 1,
wherein in the forwarding, a forwarding time is controlled based on one or more of a latency budget, which is based on
  a relationship between a current time and the defined maximum allowed latency or the defined minimum required latency, and
  an expected latency, which represents an expected delay for delivery of the user plane data packet to an egress node of the time-sensitive communication system.

4. The method according to claim 1, wherein
the mobile communication system is a 3G PP-standardized communication system, or
the time-sensitive communication system is a IEEE-standardized communication system, or
the mobile communication system is integrated in the time-sensitive communication system and
the mobile communication system represents a logical link or bridge of the time-sensitive communication system.

5. A computer program embodied on a non-transitory computer-readable medium, said computer program comprising computer program code which, when the computer program code is executed on a computer, is configured to cause the computer to carry out the method according to claim 1.

6. A method comprising,
configuring, by a user plane node of a mobile communication system, a quality-of-service flow within a packet data unit session in the mobile communication system by using a quality-of-service profile of deterministic communication based on setting information of the quality-of-service profile of deterministic communication, in which minimum required latency and maximum allowed latency for delivery of user plane data packets are defined, said quality-of-service flow being for delivery of user plane data packets including data of a time-sensitive communication system, receiving, by the user plane node from a previous user plane node of the mobile communication system, a user plane data packet in the configured quality-of-service flow within the packet data unit session, and processing, by the user plane node, the received user plane data packet in accordance with the quality-of-service profile of deterministic communication by using a delivery-related parameter in the user plane data packet, said delivery-related parameter being indicative of a time attribute of the user plane data packet, wherein the processing comprises:

calculating, by the user plane node, a current packet delay representing a difference between a current time and a reference time with respect to an ingress arrival time which is indicated by a time stamp inserted in the user plane data packet, wherein the delivery-related parameter comprises the time stamp, when the calculated current packet delay is smaller than the defined maximum allowed latency:

forwarding, by the user plane node, the user plane data packet, in which the time stamp is inserted, without changing the time stamp, to a next user plane node in the mobile communication system towards the session downstream side; or buffering the user plane data packet fora buffering time representing a difference between the defined minimum required latency and the current time, if the calculated current packet delay is smaller than the defined minimum required latency, and forwarding the user plane data packet to an egress node of the time-sensitive communication system; and when the calculated current packet delay is equal to or larger than the defined maximum allowed latency, discarding, by the user plane node, the user plane data packet.

7. The method according to claim 6,
wherein the reference time is
  the ingress arrival time which is indicated by the time stamp inserted in the user plane data packet, or
  either one of a start time, a middle time or an end time of a receive window in which the ingress arrival time falls.

8. A method, comprising:
configuring, by a user plane node of a mobile communication system, a quality-of-service flow within a packet data unit session in the mobile communication system by using a quality-of-service profile of deterministic communication based on setting information of the quality-of-service profile of deterministic communication, in which minimum required latency and maximum allowed latency for delivery of user plane data packets are defined, said quality-of-service flow being for delivery of user plane data packets including data of a time-sensitive communication system, receiving, by the user plane node from a previous user plane node of the mobile communication system, a user plane data packet in the configured quality-of-service flow within the packet data unit session, and processing, by the user plane node, the received user plane data packet in accordance with the quality-of-service profile of deterministic communication by using a delivery-related parameter in the user plane data packet, said delivery-related parameter being indicative of a time attribute of the user plane data packet, wherein the processing comprises:
calculating, by the user plane node, an ingress time value of the user plane data packet on the basis of a counter value in the user plane data packet and predefined periodicity and offset values for the delivery of user plane data packets including data of the time-sensitive communication system,
wherein the delivery-related parameter comprises the counter value,
calculating, by the user plane node, a current packet delay representing a difference between a current time and a reference time with respect the ingress time value of the user plane data packet,
when the calculated current packet delay is smaller than the defined maximum allowed latency:
forwarding, by the user plane node, the user plane data packet, without changing the counter value, to a next user plane node in the mobile communication system towards a session downstream side; or,
buffering, by the user plane node, the user plane data packet for a buffering time representing a difference between the defined minimum required latency and the current time, if the calculated current packet delay is smaller than the defined minimum required latency, and
forwarding, by the user plane node, the user plane data packet to an egress node of the time-sensitive communication system; and
when the calculated current packet delay is equal to or larger than the defined maximum allowed latency:
discarding the user plane data packet.

9. The method according to claim 8,
wherein the reference time is
the calculated ingress time value, or
either one of a start time, a middle time or an end time of a receive window, wherein the calculated ingress time value is within the receive window.

10. The method according to claim 8,
wherein in the forwarding, a forwarding time is controlled based on one or more of a latency budget, which is based on
a relationship between a current time and the defined maximum allowed latency or the defined minimum required latency, and
an expected latency, which represents an expected delay for delivery of the user plane data packet to an egress node of the time-sensitive communication system.

11. An apparatus, comprising:
at least one processor; and at least one memory including a computer program code,
wherein the at least one memory and the computer program code are configured, with the at least one processor, to cause the apparatus to perform at least:
configuring a quality-of-service flow within a packet data unit session in a mobile communication system by using a quality-of-service profile of deterministic communication based on setting information of the quality-of-service profile of deterministic communication, in which minimum required latency and maximum allowed latency for delivery of user plane data packets are defined,
said quality-of-service flow being for delivery of user plane data packets including data of a time-sensitive communication system,
receiving, from an ingress node of the time-sensitive communication system, a user plane data packet in the configured quality-of-service flow within the packet data unit session, and
processing the received user plane data packet in accordance with the quality-of-service profile of deterministic communication by using a delivery-related parameter in the user plane data packet,
said delivery-related parameter being indicative of a time attribute of the user plane data packet,
wherein the processing of the received user plane data packet comprises:
inserting, in the user plane data packet, a time stamp indicating an ingress arrival time when the user plane data packet is received by the mobile communication system,
wherein the delivery-related parameter comprises the time stamp, and
forwarding the user plane data packet, in which the time stamp is inserted, to a next user plane node in the mobile communication system towards a session downstream side.

12. The apparatus according to claim 11,
wherein, when the user plane data packet is received from a previous user plane node in the mobile communication system node towards a session upstream side, the at least one memory and computer program code are further configured, with the at least one processor, to cause the apparatus to perform:
receiving the user plane data packet from the previous user plane node; and
forwarding the user plane data packet, in which the time stamp is inserted, without changing the time stamp, to a next user plane node in the mobile communication system towards a session downstream side.

13. The apparatus according to claim 11,
wherein in the forwarding, a forwarding time is controlled based on one or more of a latency budget, which is based on
a relationship between a current time and the defined maximum allowed latency or the defined minimum required latency, and
an expected latency, which represents an expected delay for delivery of the user plane data packet to an egress node of the time-sensitive communication system.

14. The apparatus according to claim 11, wherein
the mobile communication system is a 3G PP-standardized communication system, or
the time-sensitive communication system is a IEEE-standardized communication system, or the mobile communication system is integrated in the time-sensitive communication system such that the mobile communication system represents a logical link or bridge of the time-sensitive communication system.

15. An apparatus, comprising:
at least one processor; and at least one memory including a computer program code, wherein the at least one memory and the computer program code are configured, with the at least one processor, to cause the apparatus to perform at least:
configuring a quality-of-service flow within a packet data unit session in a mobile communication system by using a quality-of-service profile of deterministic communication based on setting information of the quality-of-service profile of deterministic communication, in which minimum required latency and maximum allowed latency for delivery of user plane data packets are defined,
said quality-of-service flow being for delivery of user plane data packets including data of a time-sensitive communication system,
receiving, from an ingress node of the time-sensitive communication system, a user plane data packet in the configured quality-of-service flow within the packet data unit session, and
processing the received user plane data packet in accordance with the quality-of-service profile of deterministic communication by using a delivery-related parameter in the user plane data packet,
said delivery-related parameter being indicative of a time attribute of the user plane data packet,
wherein the processing of the received user plane data packet comprises:
calculating a current packet delay representing a difference between a current time and a reference time with respect to an ingress arrival time which is indicated by a time stamp inserted in the user plane data packet,
wherein the delivery-related parameter comprises the time stamp, when the calculated current packet delay is smaller than the defined maximum allowed latency:
forwarding the user plane data packet, in which the time stamp is inserted, without changing the time stamp, to a next user plane node in the mobile communication system towards a session downstream side, if the calculated current packet delay is smaller than the defined maximum allowed latency, or
buffering the user plane data packet for a buffering time representing a difference between the defined minimum required latency and the current time, if the calculated current packet delay is smaller than the defined minimum required latency, and
forwarding the user plane data packet to an egress node of the time-sensitive communication system; and
when the calculated current packet delay is equal to or larger than the defined maximum allowed latency, discarding the user plane data packet.

16. The apparatus according to claim 15,
wherein the reference time is
the ingress arrival time which is indicated by the time stamp inserted in the user plane data packet, or
either one of a start time, a middle time or an end time of a receive window in which the ingress arrival time falls.

17. An apparatus, comprising:
at least one processor; and at least one memory including a computer program code, wherein the at least one memory and the computer program code are configured, with the at least one processor, to cause the apparatus to perform at least:
configuring a quality-of-service flow within a packet data unit session in a mobile communication system by using a quality-of-service profile of deterministic communication based on setting information of the quality-of-service profile of deterministic communication, in which minimum required latency and maximum allowed latency for delivery of user plane data packets are defined,
said quality-of-service flow being for delivery of user plane data packets including data of a time-sensitive communication system,
receiving, from an ingress node of the time-sensitive communication system, a user plane data packet in the configured quality-of-service flow within the packet data unit session, and
processing the received user plane data packet in accordance with the quality-of-service profile of deterministic communication by using a delivery-related parameter in the user plane data packet,
said delivery-related parameter being indicative of a time attribute of the user plane data packet,
wherein the processing of the received user plane data packet comprises:
calculating an ingress time value of the user plane data packet on the basis o fa counter value in the user plane data packet and predefined periodicity and offset values for the delivery of user plane data packets including data of the time-sensitive communication system,
wherein the delivery-related parameter comprises the counter value,
calculating a current packet delay representing a difference between a current time and a reference time with respect the ingress time value of the user plane data packet,
when the calculated current packet delay is smaller than the defined maximum allowed latency:
forwarding the user plane data packet, without changing the counter value, to a next user plane node in the mobile communication system towards a session downstream side, or
buffering the user plane data packet for a buffering time representing a difference between the defined minimum required latency and the current time, if the calculated current packet delay is smaller than the defined minimum required latency, and
forwarding, by the user plane node, the user plane data packet to an egress node of the time-sensitive communication system; and
when the calculated current packet delay is equal to or larger than the defined maximum allowed latency: discarding the user plane data packet.

18. The apparatus according to claim 17,
wherein the reference time is
the calculated ingress time value, or
either one of a start time, a middle time or an end time of a receive window,
wherein the calculated ingress time value is within the receive window.

19. The apparatus according to claim 17,
wherein in the forwarding, a forwarding time is controlled based on one or more of a latency budget, which is based on a relationship between a current time and the defined maximum allowed latency or the defined minimum required latency, and an expected latency, which represents an expected delay for delivery of the user plane data packet to an egress node of the time-sensitive communication system.

\* \* \* \* \*